US012745171B2

(12) United States Patent
Yu et al.

(10) Patent No.: US 12,745,171 B2
(45) Date of Patent: Sep. 22, 2026

(54) CELL DETERMINATION METHOD AND ELECTRONIC DEVICE

(71) Applicant: GUANGDONG OPPO MOBILE TELECOMMUNICATIONS CORP., LTD., Dongguan (CN)

(72) Inventors: Xinlei Yu, Dongguan (CN); Haitao Li, Dongguan (CN); Jingran Chen, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 377 days.

(21) Appl. No.: 18/499,148

(22) Filed: Oct. 31, 2023

(65) Prior Publication Data

US 2024/0064629 A1 Feb. 22, 2024

Related U.S. Application Data

(63) Continuation of application No. PCT/CN2021/092215, filed on May 7, 2021.

(51) Int. Cl.
*H04W 48/20* (2009.01)
*H04W 36/08* (2009.01)
*H04W 84/06* (2009.01)

(52) U.S. Cl.
CPC ........... *H04W 48/20* (2013.01); *H04W 36/08* (2013.01); *H04W 84/06* (2013.01)

(58) Field of Classification Search
CPC ...... H04W 48/20; H04W 36/08; H04W 84/06
See application file for complete search history.

(56) References Cited

U.S. PATENT DOCUMENTS

| | | | | |
|---|---|---|---|---|
| 2010/0279693 | A1* | 11/2010 | Hole | H04W 48/20 455/436 |
| 2013/0155847 | A1* | 6/2013 | Li | H04W 24/04 370/225 |
| 2013/0286865 | A1* | 10/2013 | Johansson | H04W 52/40 370/252 |
| 2020/0322953 | A1* | 10/2020 | Hunukumbure | H04L 5/0048 |
| 2020/0396000 | A1 | 12/2020 | Ryu et al. | |
| 2021/0084565 | A1* | 3/2021 | Ananth | H04W 28/0983 |
| 2021/0119861 | A1 | 4/2021 | Tripathi et al. | |

(Continued)

FOREIGN PATENT DOCUMENTS

| | | | | |
|---|---|---|---|---|
| CN | 104115419 A | | 10/2014 | |
| CN | 107995595 A | * | 5/2018 | H04W 8/16 |

(Continued)

OTHER PUBLICATIONS

3GPP TS 22.261,SA1 document: 5G system business requirements, Jan. 2021; 6.9.2.5, Satellite and Relay UEs are related to the present invention.

(Continued)

*Primary Examiner* — Duc C Ho
(74) *Attorney, Agent, or Firm* — Ladas & Parry, LLP

(57) ABSTRACT

A cell determination method and an electronic device. The method comprises receiving a first message from a network node at a current cell, wherein the first message is configured to indicate whether a Non Terrestrial Network (NTN) exists in a backhaul link of the current cell; and performing a cell selection based on the first message.

20 Claims, 8 Drawing Sheets

(56) References Cited

U.S. PATENT DOCUMENTS

| | | | | |
|---|---|---|---|---|
| 2022/0038981 | A1* | 2/2022 | Kim | H04W 36/24 |
| 2022/0256424 | A1* | 8/2022 | Fu | H04W 56/0015 |

FOREIGN PATENT DOCUMENTS

| | | | |
|---|---|---|---|
| EP | 4024959 | A1 | 7/2022 |
| KR | 20210045164 | A | 4/2021 |
| WO | 2020092566 | A1 | 5/2020 |
| WO | 2021062599 | A1 | 4/2021 |
| WO | 2021075761 | A1 | 4/2021 |
| WO | 2022233052 | A1 | 10/2022 |

OTHER PUBLICATIONS

3GPP TR 38.821, NTN SI Technical Report: NR Support for NTN Solutions, Dec. 2019, Table 5.4-1 related to the present invention.

ETRI, R1-2009020, "Other enhancements to IAB", 3GPP TSG RAN WG1 # 103-e, (Nov. 13, 2020), Section 2.

Apple, R2-2009510, "Cell Selection and Selection Solutions for NTN Networks," 3GPP TSG RAN WG2 # 112-e, Nov. 13, 2020 (Nov. 13, 2020), all pages.

Catt et al. S2-2100644, "Discussion on Satellite Backhaul." 3GPP TSG SA2 Meeting # 143-e, Mar. 9, 2021 (Mar. 9, 2021), full text.

International Search Report, International Application No. PCT/CN2021/092215, mailed Jan. 28, 2022.

Written Opinion of the International Searching Authority in International Application No. PCT/CN2021/092215, mailed Jan. 28, 2022, with machine English translation provided by WIPO and by applicant's foreign counsel.

"3rd Generation Partnership Project; Technical specification Group services andsystem Aspects ; study on architecture aspects for using satellite access in 5G(Release 17)", 3GPP Draft; 23.737, v17.1.0, 3rd Generation Partnership Project (3GPP) , Mobilecompetence Centre : 650, Route Des Lucioles ; F-06921 Sophia-Antipolis Cedex; France, Jul. 3, 2020 (Jul. 3, 2020), XP051906993.

European Search Report for the corresponding European Patent Application No. 21939698.3, mailed Jun. 11, 2024 (14 pages).

* cited by examiner

CELL DETERMINATION METHOD AND ELECTRONIC DEVICE

CROSS REFERENCE TO RELATED APPLICATIONS

The present disclosure is a continuation of International (PCT) Patent Application No. PCT/CN2021/092215 filed on May 7, 2021, the entire contents of which are hereby incorporated by reference in its entirety.

TECHNICAL FIELD

The present disclosure relates to a technical field of satellite communications, and in particular to a cell determination method and an electronic device.

BACKGROUND

Currently, the 3rd Generation Partnership Project (3GPP) is studying a Non Terrestrial Network (NTN). A typical NTN includes the satellite communications, etc.

Satellite communications have characteristics such as a long communication distance, a large coverage area, and a flexible networking, etc., and may provide services for both fixed terminals and various mobile terminals. In order to ensure a coverage of a satellite and increase a system capacity of a whole satellite communication system, the satellite employs multiple beams to cover the ground. One satellite may form dozens or even hundreds of beams to cover the ground. One satellite beam may cover a ground area having a diameter ranging from tens to hundreds of kilometers. Since a distance between a terminal and the satellite and a distance between the satellite and a ground station are unduly great, a delay between the terminal and a data network is greater. Therefore, the NTN is not suitable for some delay-sensitive services.

In addition, an Integrated Access and Backhaul (IAB) technology is introduced into a 5G technology. The IAB technology replaces an optic fiber backhaul by a wireless backhaul. When the IAB technology and the satellite communications coexist, how to ensure a service quality is regarded as an urgent problem to be solved.

SUMMARY OF THE DISCLOSURE

Embodiments of the present disclosure provide a cell determination method and an electronic device.

According to a first aspect, a cell determination method is provided in the embodiments of the present disclosure and includes receiving a first message from a network node at a current cell, wherein the first message is configured to indicate whether a Non Terrestrial Network (NTN) exists in a backhaul link of the current cell; and performing a cell selection based on the first message.

According to a second aspect, a cell determination method is provided in the embodiments of the present disclosure and includes receiving a second message from a network node at a current cell, wherein the second message is configured to indicate whether a Non Terrestrial Network (NTN) exists in a backhaul link of the current cell and/or a backhaul link of a neighbor cell of the current cell; and performing a cell reselection based on the second message.

According to a third aspect, an electronic device is provided in the embodiments of the present disclosure and includes a processor; a memory; and a computer program, stored on the memory and runnable on the processor. When the processor executes the computer program, the electronic device is caused to implement the method as described in the above first aspect or the method as described in any feasible implementation of the first aspect; or, when the processor executes the computer program, the electronic device is caused to implement the method as described in the above second aspect or the method as described in any feasible implementation of the second aspect.

DETAILED DESCRIPTION

Figure 1A:
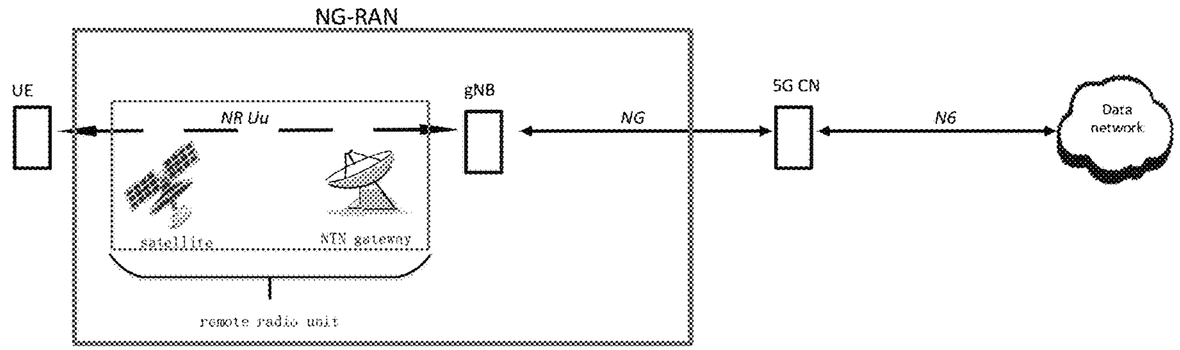
FIG. 1A is a schematic diagram of a transparent payload satellite network architecture.

Technical schemes of the embodiments of the present disclosure will be described below in conjunction with accompanying drawings in the embodiments of the present disclosure. Apparently, described embodiments are a part but not all of the embodiments of the present disclosure. Other embodiments obtained by one of ordinary skill in the related art based on the embodiments of the present disclosure without creative labor shall all fall into the scope of the present disclosure.

The NTN (Non Terrestrial Network) generally provides communication services for ground users in a manner of the satellite communication. Compared with a ground cellular network, the satellite communication has many unique advantages.

For example, the satellite communication is not limited by a geographical area of the user. A general terrestrial communication cannot cover an area in which a communication equipment cannot be set up, such as ocean, a mountain, a desert, etc., or a sparsely populated area in which the communication equipment is not set up. However, for the satellite communication, since one satellite may cover a large area ground and may move orbitally around the Earth. Therefore, in theory, every corner of the earth may be covered by the satellite communication.

For another example, the satellite communication may cover a remote mountainous area, a poor and backward area, such that users in these areas may enjoy advanced voice communication and mobile Internet technologies, which is conducive to narrowing a digital divide with developed areas and promoting the development of these areas.

For another example, a distance of the satellite communication is long, and a communication cost is not significantly increased even though a communication distance is increased.

For another example, the satellite communication has a high stability and free from limitations of natural disasters.

In view of the above-mentioned advantages of the satellite communication, the satellite communication has been developed rapidly.

Communication satellites may be divided into a low-Earth orbit (LEO) satellite, a medium-Earth orbit (MEO) satellite, a geosynchronous orbit (GEO) satellite, a high elliptical orbit (HEO) satellite, etc., according to different orbit altitudes. The LEO and GEO are primarily studied in the related art.

1.LEO

An altitude range of the LEO satellite is 500 km-1500 km, and a corresponding orbital period ranges approximately from 1.5 hours to 2 hours. A signal propagation delay of a single hop communication between a user equipment and the satellite is generally less than 20 ms. The maximum satellite visualization time is 20 minutes. A signal propagation distance is short, a link loss is low, and a requirement for a transmitting power of a user terminal is not high.

2. GEO

The orbit altitude of the GEO is 35786 km, a period of rotating around the Earth is 24 hours. The signal propagation delay of the single hop communication between the user equipment and the satellite is generally 250 ms.

In order to ensure the coverage of the satellite and increase the system capacity of the whole satellite communication system, the satellite employs the multiple beams to cover the ground. One satellite may form dozens or even hundreds of beams to cover the ground. One satellite beam may cover a ground area having a diameter ranging from tens to hundreds of kilometers.

In the related art, two types of satellite network architectures are considered by the 3GPP, one is a transparent payload satellite network architecture and the other is a regenerative payload satellite network architecture FIG. 1A is a schematic diagram of the transparent payload satellite network architecture. As shown in FIG. 1A, the satellite network architecture includes a Next Generation Radio Access Network (NG-RAN), a 5G core network (5G CN), and a data network. The NG-RAN includes the user equipment (UE), a base station (gNB), a (NTN) gateway, etc. The UE is connected to the gNB through a new radio (NR) Uu interface (i.e., a general user network interface). The gNB is connected to a 5G core network (5G CN) through a NG interface. The 5G CN is connected to a data network through a N6 interface. The satellite and the NTN gateway form a Remote Radio Unit (RRU). In a process of the UE and the gNB performing a data transmission, the data is forwarded through the satellite and the NTN gateway. The satellite and the NTN gateway do not perform a protocol stack process for the data during the forwarding process, such that the transparent payload is achieved.

Figure 1B:
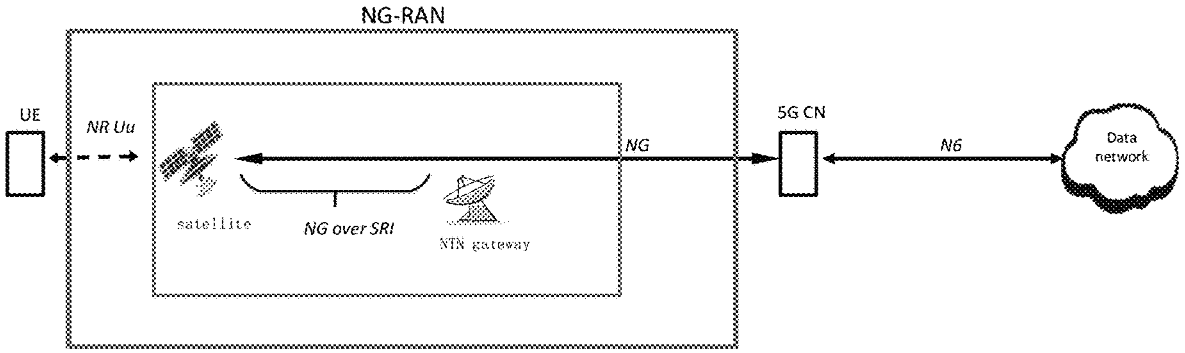
FIG. 1B is a schematic diagram of a regenerative payload satellite network architecture.

FIG. 1B is a schematic diagram of a regenerative payload satellite network architecture. The satellite network architecture includes the NG-RAN, the 5G CN, and the data network. The NG-RAN includes the UE, the satellite, the NTN gateway. The UE is connected to the satellite through the NR Uu interface. The satellite is connected to the 5G CN through the NG interface. The 5G CN is connected to the data network through the N6 interface. The satellite is connected to the NTN gateway through the NG interface (i.e., a NG over SRI) running on a Satellite Radio Interface (SRI). When the UE performs the data transmission, the data is forwarded through the satellite. The satellite performs the protocol stack process for the data during the forwarding process, such that the regenerative payload is achieved.

In the architectures shown in FIG. 1A and FIG. 1B, A radio link between the satellite and the NTN gateway is generally referred to as a feeder link. The connection between the UE and the satellite is generally referred to as a service link.

The 5G NR supports the IAB technology. Based on the IAB technology, 5G may be deployed in a place in which an optical fiber cannot be laid with a lower cost and a simpler manner, and the wireless backhaul is supported to replace with the optical fiber backhaul through extending NR. Therefore, the IAB technology is considered to be an important technology in terms of popularizing 5G.

In IAB technology, the donor node accesses to the 5G CN through the NG interface, and the IAB node accesses to the donor node through the Uu interface, such that a link of signal transferring is formed. In order to access to a 5G network, the UE is simply required to access to the IAB node. The IAB node may access to the internet through a standalone (SA) manner or a non standalone (NSA) manner. An example is as shown in FIG. 2A and FIG. 2B.

Figure 2A:
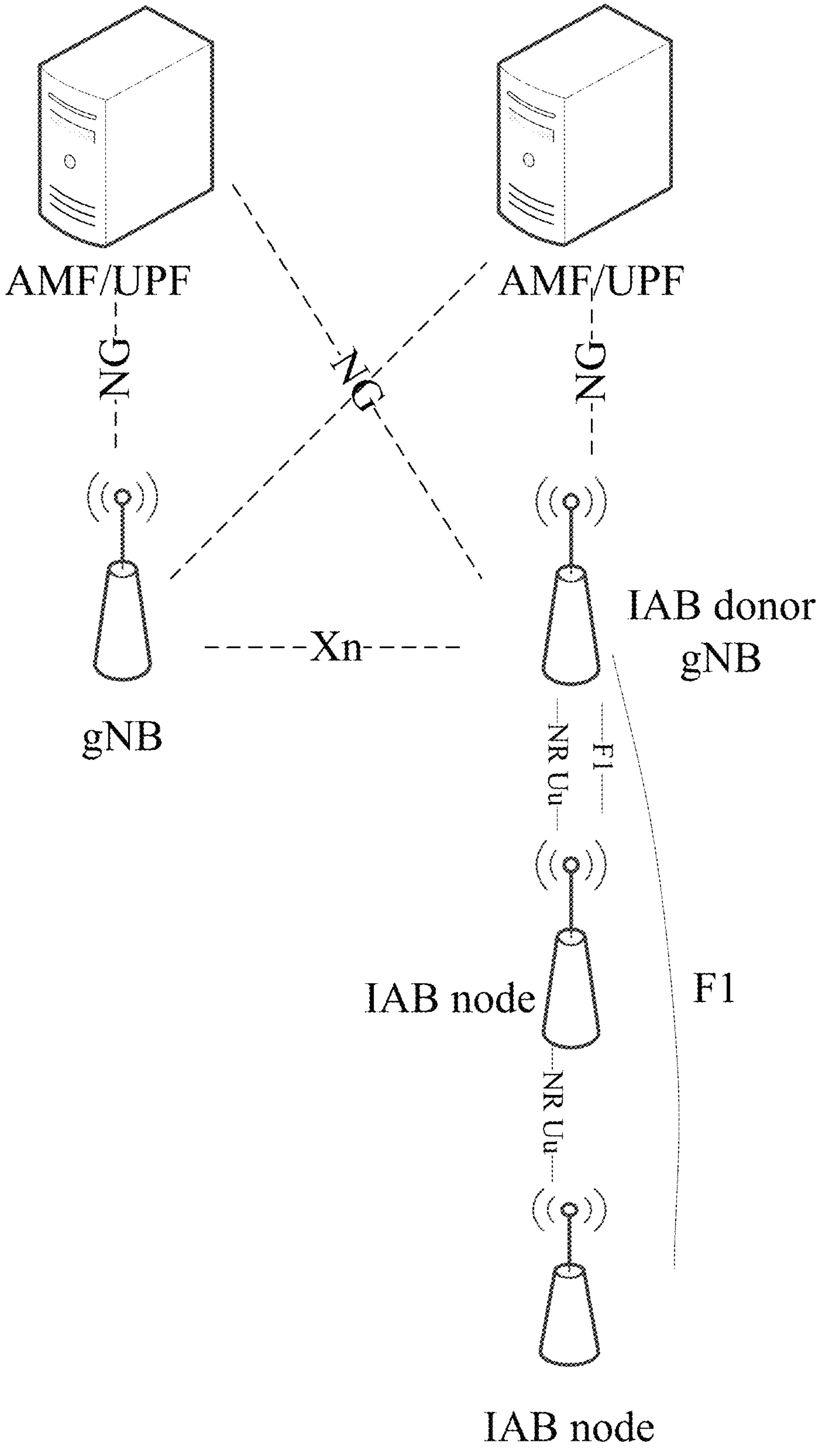
FIG. 2A is a schematic diagram of an IAB node accessing a network in a SA manner.

FIG. 2A is a schematic diagram of the IAB node accessing a network in the SA manner. As shown in FIG. 2A, each relay node supporting a NR access and a radio backhaul is referred to as the IAB node. At a network side, an end point of a NR backhauling is referred to as the IAB donor. The IAB donor represents the gNB supporting an IAB function. The IAB donor accesses to the 5G CN through the NG interface, such as an Access and Mobility Management Function (AMF) entity, a User Plane Function (UPF) entity, etc. The IAB donor is connected to other gNBs through Xn interfaces.

Figure 2B:
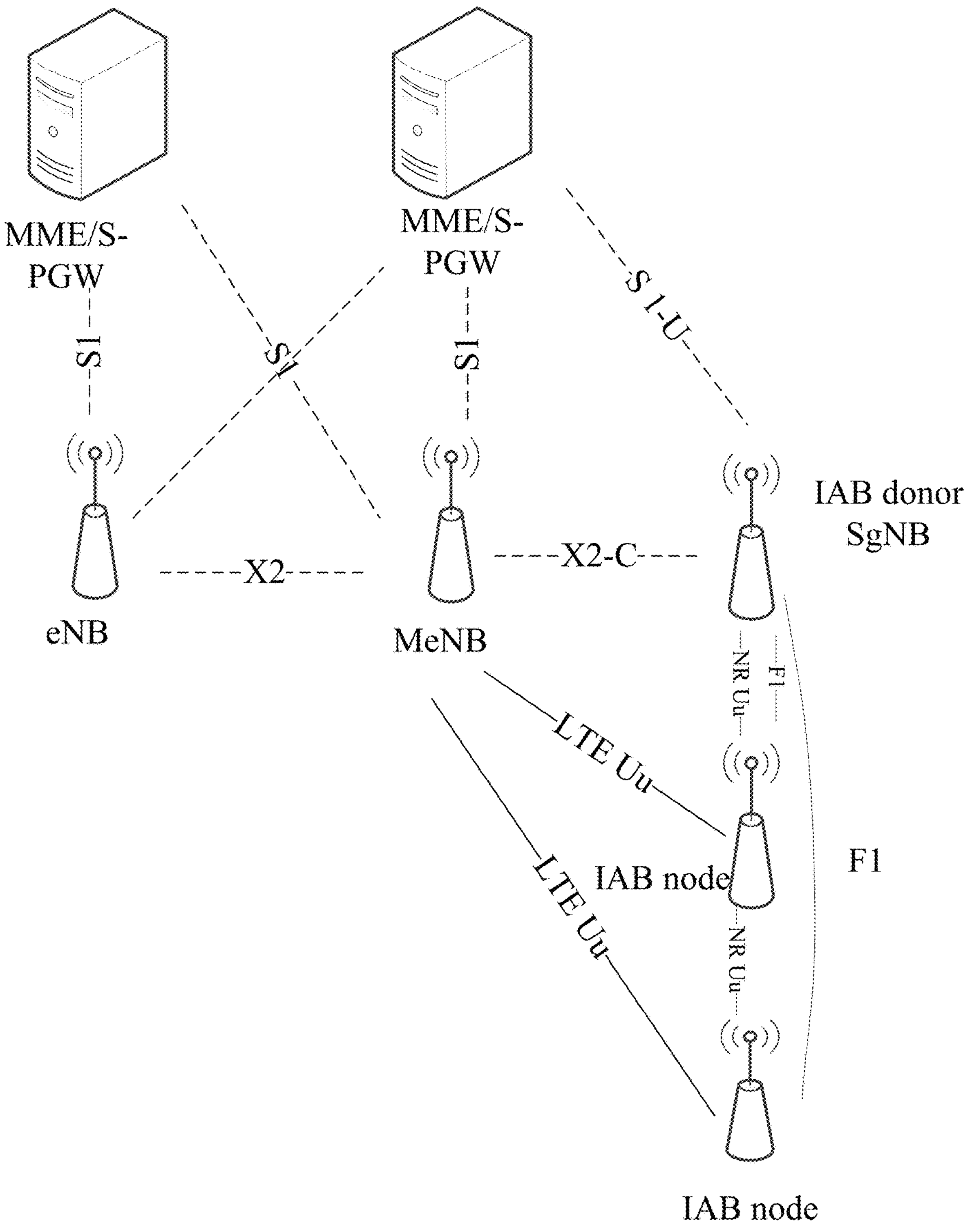
FIG. 2B is a schematic diagram of the IAB node accessing the network in an NSA manner.

FIG. 2B is a schematic diagram of the IAB node accessing to the network in the NSA manner. As shown in FIG. 2B, the NSA manner is, e.g., an option 3, i.e., EN-DC. That is, the NSA employs a dual connection of a 4G radio access network and the 5G NR, with a 4G base station (eNB) as a primary station and the 5G gNB as a secondary station. The IAB donor represents the gNB supporting the IAB function. The IAB donor is connected to a 4G core network through a S1-U interface, such as a Mobility Management Entity (MME), a Service-PDN gateway (S-PGW), etc. The IAB donor is connected to a macro cell base station (MeNB) in the 4G network through a X2-C interface. The MeNB is connected to the eNB through a X2 interface, and the MeNB is connected to the MME and S-PGW through S1 interfaces. The IAB node establishes a connection with the MeNB through a LTE Uu interface.

In FIG. 2A and FIG. 2B, under a Centralized Unit-Distributed Unit (CU-DU) separation structure, the IAB donor includes an IAB donor CU and an IAB donor DU. The IAB node includes an IAB node MT and an IAB node DU. The IAB donor CU and IAB donor DU are connected to each other via a wired network. It is noted that the IAB donor CU is able to be connected to multiple IAB donor DUs through a wired mode. However, in a CU/DU separation scenario, since the IAB donor DU can only access to one IAB donor CU and can only belong to one gNB, the IAB donor DU can only be connected to one IAB donor CU through the wired mode, and the IAB node DU can only be connected to one IAB donor CU through a relay manner.

The IAB node includes the IAB node MT and the IAB node DU. The IAB node DU may serve a normal UE or a next-hop IAB node through the NR Uu interface. An F1 interface in logic exists between each IAB node and the IAB donor CU of the IAB donor. The IAB node MT has functions of a physical layer, a layer 2, and a Non-Access-Stratum (NAS), and is able to be connected to the IAB node DU or the IAB donor.

The IAB node is connected to one IAB donor through a single hop and multiple hops, which forms a Directed Acyclic Graph (DAG) with the IAB donor as a root node. An example is as shown in FIG. 4.

Figure 3:
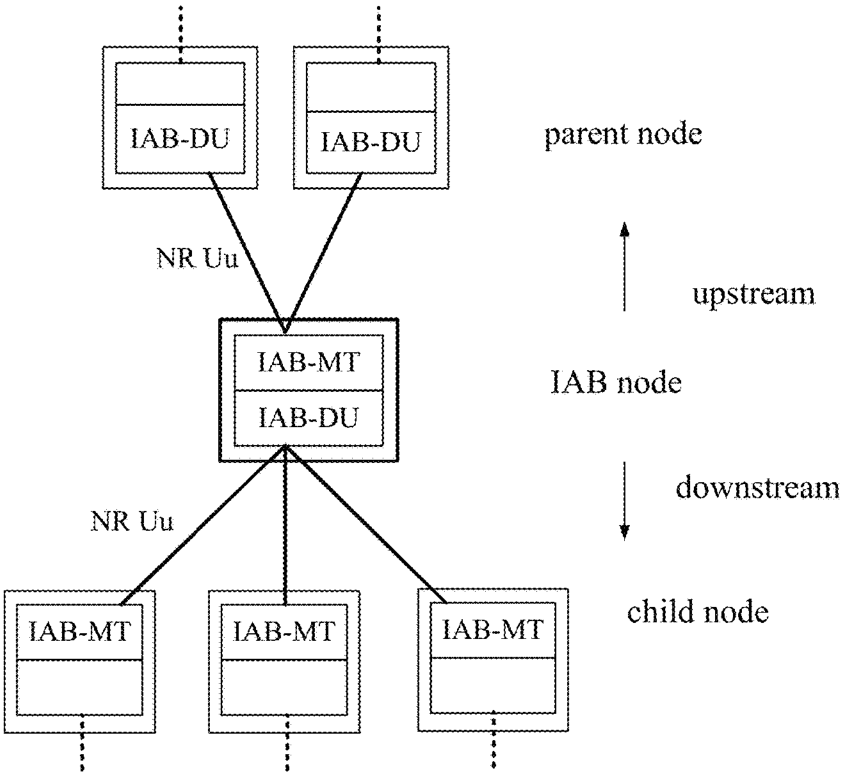
FIG. 3 is a schematic view of a topology structure of a DAG.

FIG. 3 is a schematic view of a topology structure of a DAG. As shown in FIG. 3, in this DAG topology structure, a neighbor node of an IAB DU (i.e., the IAB node UD) or a neighbor node of IAB donor DU is referred to as a child node, and the neighbor node of an IAB MT is referred to as a parent node. From the perspective of the IAB node, a direction from the IAB node to the child node is referred to as a downstream direction, and a direction from the IAB node to the parent node is referred to as an upstream direction. A link between the IAB node and the IAB donor and a link between IAB nodes are referred to as the backhaul links. The IAB donor is configured to perform managements of a resource, a topology, and routing of the base station in an IAB topology.

As shown in FIG. 1A, FIG. 1B, FIG. 2A, and FIG. 2B, when the IAB technology and the satellite communication coexist, the NTN may exist between the IAB node and the IAB donor. Therefore, when UE performs the cell selection or the cell reselection, a backhaul link of a selected camping cell may exist the NTN. That is, the IAB node providing a service for the camping cell establishes the backhaul link with the IAB donor through the satellite.

However, in a satellite communication network, especially in a GEO satellite network, since a distance between the UE and the satellite and the distance between the satellite and the ground station are unduly large, a delay between the UE and the data network is longer and some delay-sensitive services are not suitable to be employed in the NTN network. Therefore, when the IAB node establishes the backhaul link with the IAB donor through the satellite, if the UE has no idea of a backhaul network being established between the IAB node and the IAB donor through the satellite, and simply performs the cell selection or cell reselection based on a Reference Signal Received Power (RSRP), a Reference Signal Receiving Quality (RSR) and a Reference Signal Received Quality (RSRQ) to determine a camping cell and access the camping cell, it is likely that the backhaul link is established between the IAB node and the IAB donor corresponding to the camping cell through the satellite.

In other words, when the IAB technology and the satellite communication coexist, if the cell selection or the cell reselection is performed only based on the RSRP or the RSRQ, a selected camping cell may not be an optimal cell, which leads to a degradation of a service quality.

Based on the above, the cell determination method, the cell determination apparatus, the cell determination device, and the readable storable medium are provided in the embodiments of the present disclosure. The electronic device acquires a connection manner of the backhaul link and selects a suitable cell based on the connection manner to access, such that a purpose of improving the service quality may be improved.

The cell determination method provided in the embodiments of the present disclosure is suitable for a scenario of the IAB technology and the satellite communication coexisting, which may employ the network architectures as shown in the above FIG. 1A and FIG. 1B. The IAB node is connected to the IAB donor through the single hop or the multiple hops. An example is as shown in FIG. 4A, FIG. 4B, and FIG. 4C.

Figure 4A:
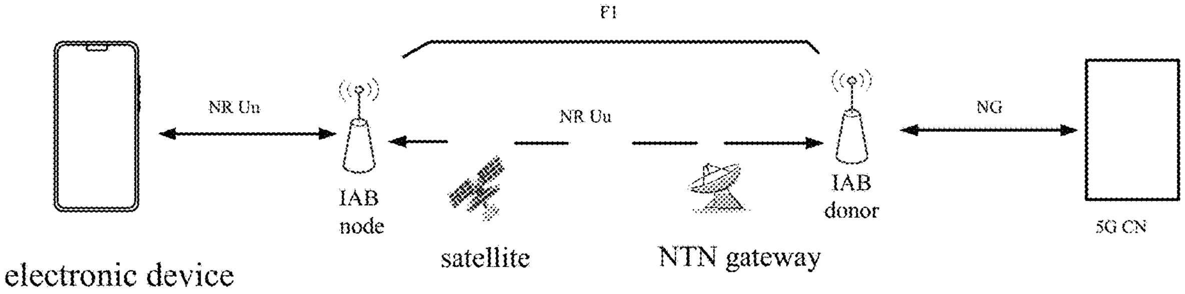
FIG. 4A is a schematic diagram of a network architecture of a cell determination method according to some embodiments of the present disclosure.

FIG. 4A is a schematic diagram of a network architecture of the cell determination method according to some embodiments of the present disclosure. As shown in FIG. 4A, in this network architecture, the IAB node is connected to the IAB donor through the single hop.

Figure 4B:
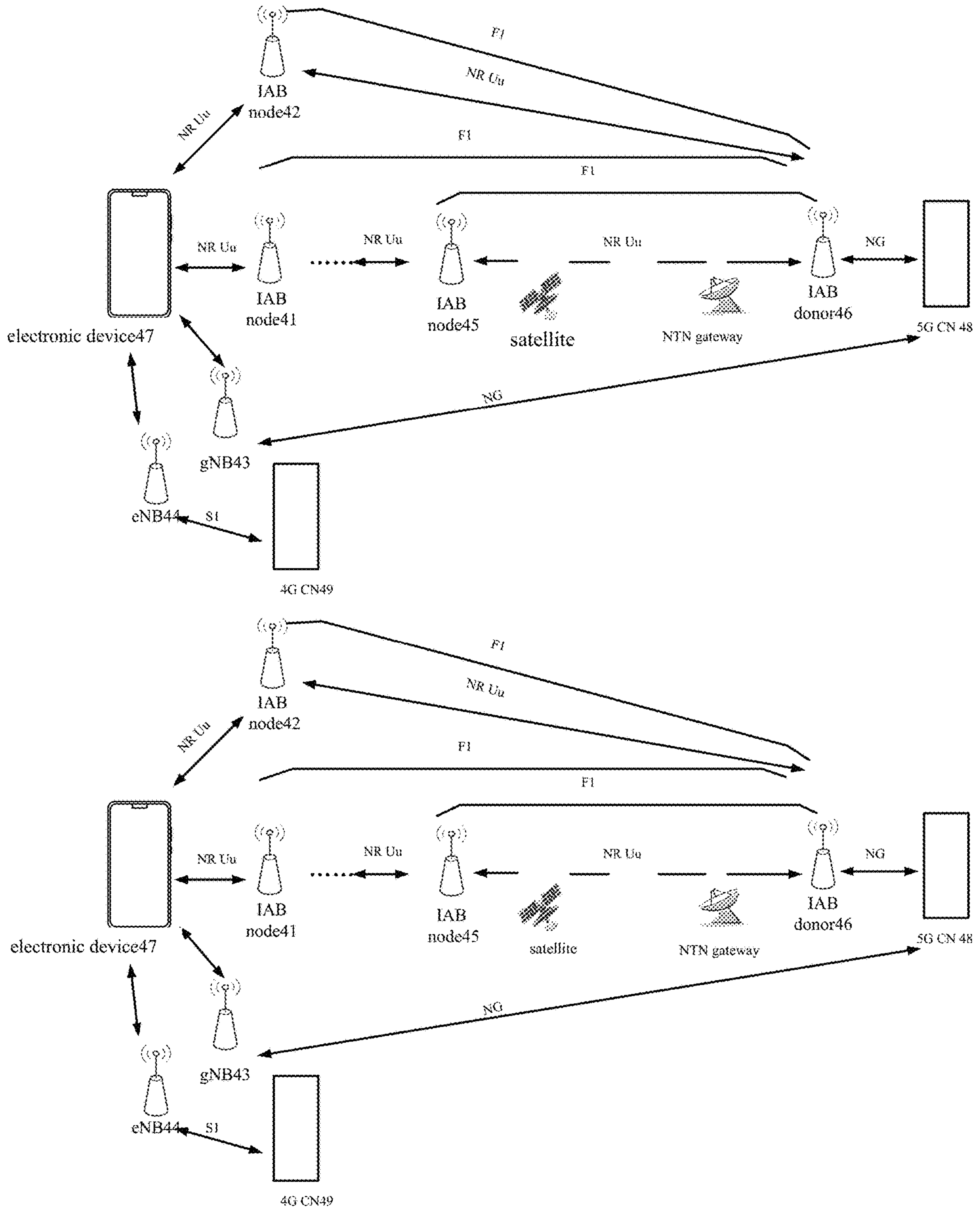
FIG. 4B is a schematic diagram of another network architecture of the cell determination method according to some embodiments of the present disclosure.
Figure 4C:
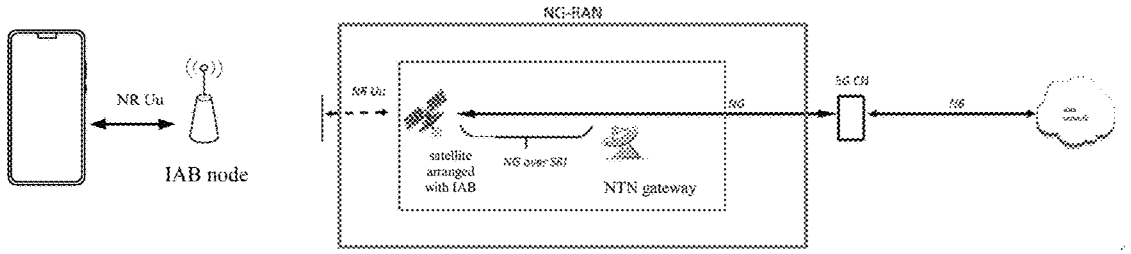
FIG. 4C is a schematic diagram of a yet network architecture of the cell determination method according to some embodiments of the present disclosure.

FIG. 4B is a schematic diagram of another network architecture of the cell determination method according to some embodiments of the present disclosure. As shown in FIG. 4B, in this network architecture, other IAB nodes may exist between an IAB node41 and an IAB node45. The backhaul link between the IAB node45 and an IAB node46 is established through the satellite. The IAB node41 is connected to the IAB donor46 through the multiple hops. The IAB donor46 is connected to a 5G CN48 the NG interface. An IAB node42 is connected to the IAB donor46 through the single hop. A gNB43 is connected to the 5G CN48 through the NG interface. The eNB44 is connected to a 4G CN49 through the S1 interface. The electronic device 47 is configured to perform the cell selection or the cell reselection.

FIG. 4A and FIG. 4B aims to transparent payload scenarios. The embodiments of the present disclosure also support regenerative payload scenarios. FIG. 4C is a schematic diagram of a yet network architecture of the cell determination method according to some embodiments of the present disclosure. In this architecture, the IAB donor is arranged on the satellite.

In addition, in the regenerative payload scenarios, the IAB donor may also be arranged between the NTN gateway and the 5G CN. It should be noted that, for the NTN network supporting the regenerative payload, the AB donor CU and IAB donor DU may be connected through a satellite link. That is, the IAB donor CU is arranged between the NTN gateway and 5G CN, and the IAB donor DU is arranged on the satellite.

As shown in FIG. 4A, FIG. 4B, and FIG. 4C, an electronic device 47 may be referred to as the UE, an access terminal, a user unit, a user station, a mobile station, a remote station, a remote terminal, a mobile device, a user terminal, a terminal, a wireless communication device, a user agent, or a user apparatus, etc.

The electronic device 47 may be a station (STA) in a WLAN, a cellular phone, a cordless phone, a Session Initiation Protocol (SIP) phone, a Wireless Local Loop (WLL) station, a Personal Digital Assistant (PDA) device, a handheld device with a wireless communication capability, a computing device, or other processing devices connected to a wireless modem, an in-vehicle device, a wearable device, a terminal device in a next generation communication system such a NR network, or a terminal device in a future evolved public land mobile network (PLMN), or the like.

In some embodiments of the present disclosure, the electronic device 47 may be deployed on land, including indoors or outdoors, being handheld, worn, or vehicle-mounted. The electronic device 47 may also be deployed on water (e.g., on a ship, etc.), or in the air (e.g., on an aircraft, a balloon, the satellite, etc.).

In the embodiments of the present disclosure, the electronic device 47 may be a mobile phone, a Pad, a computer with a wireless transceiving function, a virtual reality (VR) terminal device, an augmented reality (AR) terminal device, a wireless terminal device under an industrial control, a wireless terminal device in self driving, a wireless terminal device in a remote medical, a wireless terminal device in a smart grid, a wireless terminal device in transportation safety, and a wireless terminal device in a smart city or a wireless terminal device in a smart home, etc.

As an example, not a limitation, in the embodiments of the present disclosure, the terminal device may also be the wearable device. The wearable device may also be referred to as a wearable smart device, which is a general term of wearable devices obtained by intelligently designing and developing daily wears, such as glasses, gloves, watches, clothing, and shoes, by means of wearable techniques. The wearable devices are directly worn on a body or integrated into the clothing or an accessory of the user as a portable device. The wearable devices are more than hardware devices, may also achieve powerful functions thereof through software supports, data interactions, and cloud interactions. The wearable smart device in a broad sense includes a device having full features, a large size, and capable of achieving entire or partial functions independent of a smartphone, e.g., a smart watch, or smart glasses, etc., and a device only concentrating on a particular category of application function and required to cooperate with other devices such as the smartphone, e.g., various smart bracelets configured to monitor signs, a smart jewelry, or the like.

As shown in FIG. 4A, FIG. 4B, and FIG. 4C, in the embodiments of the present disclosure, a network node may be the IAB node41, the IAB node42, or may be a network node not supporting the IAB technology, such as the gNB43, eNB44, etc. When the network node is the network node not supporting the IAB technology, the network node is, e.g., an evolutional node B (eNB or e-NodeB), a macro base station, a micro base station (also known as "a small base station"), a pico base station, an access point (AP), a transmission point (TP), or a new generation Node B (gNodeB), etc. in a long-term evolution (LTE) system, a next generation (mobile communication system) NR system, or an authorized auxiliary access long-term evolution (LAA-LTE) system.

In the embodiments of the present disclosure, the network node is configured to communicate with the electronic device 47. The network node may be the AP in the WLAN, a Base Transceiver Station (BTS) in GSM or CDMA, a NodeB (NB) in WCDMA, or an Evolutional Node B (eNB or eNodeB) in LTE, or a relay station or the AP, or the in-vehicle device, the wearable device, and a network device (gNB) in the NR network or a network device in the future evolved PLMN network or a network device in the NTN network, etc.

In the embodiments of the present disclosure, the network node may provide a service for a cell. The electronic device 47 communicates with the network node through a transmission resource (e.g., a frequency domain resource, or in other words, a spectrum resource) employed by the cell. The cell may be a cell corresponding to the network node (such as, the base station). The cell may belong to the macro base station or a small cell. The small cell herein may include a Metro cell, a Micro cell, a Pico cell, a Femto cell, etc. These small cells have characteristics of a small coverage area and a low transmission power, and are suitable to provide a high-speed data transmission service.

The technical scheme in the embodiments of the present disclosure may be performed by the communication system of the satellite communication and the IAB technology coexisting, such as a 5G communication system, various communication systems in an evolution process from 4G to 5G. An evolved system includes a communication system in an independent networking mode and a communication system in a non-independent networking mode, such as EN-DC (the option 3), NE-DC (an option 4), and NGEN-DC (an option 7) architectures, etc.

It is understood that terms "system" and "network" may often be used interchangeably in the description. The term "and/or" in the description is only configured to describe an association relationship of associated objects, which may indicate that three relationships exist therein. The three relationships include A existing alone, both A and B existing, and B existing alone. In addition, a character "/" in the description generally indicates that associated objects before and after the character "/" have an "or" relationship.

Figure 5:
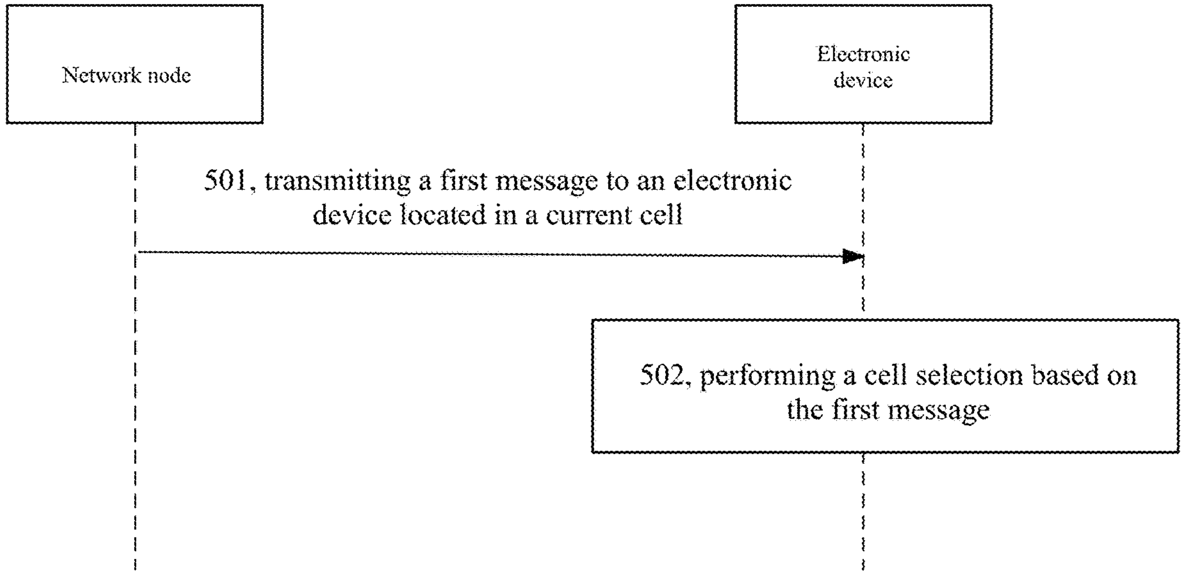
FIG. 5 is a flowchart of the cell determination method according to some embodiments of the present disclosure.

FIG. 5 is a flowchart of the cell determination method according to some embodiments of the present disclosure. The embodiment is described from the point of view of the electronic device interacting with the network node. This embodiment is configured for the cell selection and includes operations 501-502.

In an operation 501, the network node transmits a first message to an electronic device located in a current cell.

Accordingly, the electronic device at the current cell receives the first message from the network node.

The first message is configured to indicate whether the NTN exists in a backhaul link of the current cell. The backhaul link is a link between a backhaul-access integration IAB node and the donor node.

For an example, as shown in FIG. 4B, the network node is the IAB node, the eNB or the gNB. When the electronic device is turned on or enters the current cell served by the network node from a blind area, the network node transmits the first message to the electronic device.

In an operation 502, the electronic device performs a cell selection based on the first message.

In the embodiments of the present disclosure, the cell selection, also referred to as a cell primary, an initial cell selection, etc., indicates a process of the electronic device searching for all frequency points allowed by a Public Land Mobile Network (PLMN) and selecting a suitable cell to camp in combination with the first message after the electronic device is turned on or enters a coverage area of the network node from the blind area. For example, when the first message indicates that the NTN exists in the backhaul link of the current cell and a service type of the electronic device is a delay-sensitive service, the electronic device determines that the current cell is a non-camping cell. For another example, when the first message indicates that the NTN exists in the backhaul link of the current cell and a service of the electronic device is not delay-sensitive, the electronic device determines that the current cell is the non-camping cell when the current cell satisfies a first criterion. The first criterion, also referred to as an S criterion, is configured to indicate that the cell selection is a condition satisfied by the RSRP and RSRQ, etc. of the current cell.

According to the cell determination method provided in the embodiments of the present disclosure, the network node transmits the first message to the electronic device in the current cell, and the first message is configured to indicate whether the NTN exists in a backhaul link of the current cell. After receiving the first message, the electronic device performs the cell selection based on the first message. In this way, since the electronic device may determine whether the NTN exists in the backhaul link of the current cell based on the first message, the electronic device may select the suitable cell to access during the cell selection based on a factor of whether the NTN exists in the backhaul link, such that the service quality may be improved.

In the above embodiment, a to-be-selected cell is required to be measured in the process of the cell selection, in order to perform a channel-quality assessing process and determine whether a camping condition is satisfied. When the camping condition is satisfied, whether to camp is determined in combination with the first message. For example, when the current cell satisfies the first criterion, whether to camp in the current cell is determined in combination with the first message. A cell selection process is described in detail in the following.

In the embodiments of the present disclosure, when the electronic device is turned on or enters the coverage area from the blind area, the electronic device will search for all frequency points allowed by the PLMN and select the suitable cell to camp in. Types of the cell selection include an initial cell selection and a cell selection based on storage information. In the process of the cell selection, the electronic device performs the cell selection based on the storage information. The storage information indicates that the electronic device has stored some information related to carrier frequencies and may also store some parameter information of the cell. For example, a cell parameter is obtained from measurement control information which is received previously or a cell previously camped or detected. In the process of the cell selection, the suitable cell is preferred to be selected from the storage information. Once one suitable cell is available or present, the electronic device selects this cell and camps in this cell. When none of the cells of which relevant information is stored is suitable, the electronic device will initiate the initial cell selection.

In the embodiments of the present disclosure, the electronic device measures the current cell and obtains a measurement result. The electronic device determines whether the current cell satisfies the camping condition based on the measurement result. When the current cell satisfies the camping condition, the first message is further combined to determine whether to camp in the current cell. A criterion of the cell selection in a cellular network is referred to as the first criterion, and the first criterion is also referred to as the S criterion. When the current cell meets the first criterion, the electronic device determines that the current cell meets the camping condition.

The current cell meeting the first criterion means that measuring quantities of the RSRP and the RSRQ of the current cell simultaneously satisfy the following conditions:

$$\text{Srxlev}>0 \text{ and } \text{Squal}>0.$$

$$\text{SrxleV}=Q_{rxlevmeas}-(Q_{rxlevmin}+Q_{rxlevminoffset})-P_{compensation}-\text{QoffSet}_{temp}$$

$$\text{Squal}=Q_{qualmeas}-(Q_{qualmin}+Q_{qualminoffset})-\text{Qoffset}_{temp}$$

The meaning of each parameter in the above formulas is shown in Table 1 below.

TABLE 1

| | |
|---|---|
| Srxlev | a S value related to the RSRP in the Cell selection (Cell selection RX level value), a decibel(dB) as a unit |
| Squal | a S value related to the RSRP in the Cell selection (Cell selection quality value (dB)), the dB as the unit |
| $\text{Qoffset}_{temp}$ | a temporary offset value, notified in system broadcast |
| $Q_{rxlevmeas}$ | RSRP measuring quantity |
| $Q_{qualmeas}$ | RSRQ measuring quantity |
| $Q_{rxlevmin}$ | mimimum RSRP receiving intensity requirement of the cell, notified in the system broadcast |
| $Q_{qualmin}$ | mimimum RSRQ requirement of the cell, notified in the system broadcast |
| $Q_{rxlevminoffset}$ | an offset of $Q_{rxlevmin}$, considered only when normally camping in a suitable cell of a roaming network (VPLMN) and searching for a higher-priority PLMN periodically, in order to prevent an offset value of a ping-pong effect generated between two PLMNs due to a radio environment fluctuation, notified in the system broadcast |
| $Q_{qualminoffset}$ | an offset of $Q_{qualmin}$, considered only when normally camping in a suitable cell of a roaming network (VPLMN) and searching for a higher-priority PLMN periodically, in order to prevent an offset value of a ping-pong effect generated between two PLMNs due to a radio environment fluctuation, notified in the system broadcast |
| $P_{compensation}$ | a power compensation due to a low power of the electronic device, notified in the system broadcast |

In the process of the cell selection, when the current cell satisfies the first criterion, the electronic device combines the first message to determine whether to access the current cell, i.e., whether to determine the current cell to be the camping cell. The first message is configured to indicate whether the NTN exists in the backhaul link of the current cell.

In a manner, the NTN exists in the backhaul link in response to the first message carrying indication information, and no NTN exists in the backhaul link in response to the first message not carrying indication information.

In this manner, when no NTN exists in the backhaul link of the current cell and the network node supports the IAB technology, the network node does not transmit the first message and the electronic device does not receive the first message, it is determined by default that no NTN exists in the backhaul link between the network node serving the current cell and the donor node. Alternatively, the network node transmits the first message which does not carry the indication information, the electronic device determines no NTN exists in the backhaul link after receiving the first message. When the NTN exists in the backhaul link, the network node transmits the first message carrying the indication information. After receiving the first message, the electronic device determines that the NTN exists in the backhaul link.

In another manner, the first message carries the indication information of the backhaul link. The NTN exists in the backhaul link in response to the indication information of the backhaul link being 1, and no NTN exists in the backhaul link in response to the indication information of the backhaul link being 0; or the NTN exists in the backhaul link in response to the indication information of the backhaul link being 0, and no NTN exists in the backhaul link in response to the indication information of the backhaul link being 1.

In this manner, the indication information is, for example, 1 bit. 1 indicates that the NTN exists in the backhaul link, while 0 indicates that no NTN exists in the backhaul link. Alternatively, 0 indicates that the NTN exists in the backhaul link, while 1 indicates that no NTN exists in the backhaul link.

In another manner, the first message carries a delay of the backhaul link. The NTN exists in the backhaul link in response to the delay being greater than a preset delay, and no NTN exists in the backhaul link in response to the delay being less than or equal to the preset delay.

The delay may be a specific delay length, such as 20 milliseconds (ms), 40 ms, etc. The delay may also be a delay level. For example, the delay is divided into two levels according to the delay length. A first level indicates a delay greater than or equal to 20 ms, which is denoted by 0. A second level indicates a delay less than 20 ms, which is denoted by 1. In this way, 1 bit is able to denote delay information, which reduces a signaling overhead somehow.

In another manner, the NTN exists in the backhaul link in response to the first message carrying a NTN type, and no NTN exists in the backhaul link in response to the first message not carrying NTN type.

In this manner, the NTN type is, e.g., 2 bit, and the NTN type is, e.g., GEO, LEO, etc.

Based on this scheme, the network node may flexibly indicate to the electronic device whether the NTN exists in the backhaul link of the current cell through the indication information, the delay, or the NTN type.

Although the indication information, the delay, or the NTN type are taken as examples to illustrate the first message in the above. However, the embodiments of the present disclosure are not limited thereto. In other feasible implementations, the first message may also carry one or more of the indication information, the delay, or the NTN type. For example, the first message carries both the NTN type and the indication information. In this case, the electronic device determines that the NTN exists in the backhaul link based on the indication information, and further determines that the NTN in the backhaul link is the LEO or GEO, etc., based on the NTN type.

In some embodiments, when the electronic device performs the cell selection based on the first message, the electronic device determines that the current cell is the non-camping cell in response to the NTN existing in the backhaul link, and determines that the current cell is the camping cell in response to no NTN existing in the backhaul link.

As shown in FIG. 4B, in an embodiment, in the process of the cell selection, the current cell satisfies the first criterion. When the network node is the IAB node41 and the first message carries one or more of the indication information, the delay of the backhaul link, and the NTN type of the backhaul link, which are configured to indicate whether the NTN exists in the backhaul link, the electronic device is able to determine that the NTN exists in the backhaul link between the IAB node41 and the IAB donor 46 based on the first message. In this case, the electronic device determines that the current cell is the non-camping cell.

When the network node is the IAB node 42 and the current cell satisfies the first criterion, if it is agreed that the IAB node 42 not transmitting the first message implicitly indicates that no NTN exists in the backhaul link of the current cell served by the IAB node 42, the electronic device determines that no NTN exists in the backhaul link of the current cell and takes the current cell as the camping cell. Alternatively, the IAB node 42 may transmit the first message and the first message explicitly indicates that no NTN exists in the backhaul link of the current cell served by the IAB node 42. After receiving the first message, the electronic device determines that no NTN exists in the backhaul link of the current cell, and determines that the current cell is the camping cell.

When the network node is the eNB44 or the gNB43, the electronic device determines that no backhaul link associated with the IAB technology exists therein.

As shown in FIG. 4B, in another embodiment, in the process of the cell selection, the current cell satisfies the first criterion, the network node is the IAB node41, and the first message carries the delay of the backhaul link. When the electronic device determines that the delay of the backhaul link is less than or equal to the preset delay, the electronic device determines that the current cell is the camping cell. When the electronic device determines that the delay of the backhaul link is greater than the preset delay, the electronic device determines that the current cell is the non-camping cell.

In another embodiment, as shown in FIG. 4B, in the process of the cell selection, the current cell satisfies the first criterion and the first message indicates that the NTN exists in the backhaul link, the electronic device determines device characteristic. In subsequence, the cell selection is performed based on the device characteristic of the electronic device. In the process of determining the device characteristic, the electronic device determines the device characteristic based on a service type and/or a terminal type of the electronic device. When the delay-sensitive characteristic of the electronic device indicates that the electronic device is a delay-insensitive device, the current cell is determined to be the camping cell. When the delay-sensitive characteristic of the electronic device indicates that the electronic device is a delay-sensitive device, the current cell is determined to be the non-camping cell.

For example, the terminal type is, e.g., an industrial-sensor type terminal, etc. The service type is, e.g., the delay-sensitive service and the delay-insensitive service. The delay-sensitive service is, e.g., an Enhanced Mobile Broadband (EMBB) service, a voice service, a wearable service, etc.

Taking the network node being the IAB node 41 as an example, the current cell satisfies the first criterion and the NTN exists in the backhaul link of the current cell. When the terminal type of the electronic device indicates that the electronic device is the industrial-sensor type terminal, the electronic device of this type is insensitive to the delay. Therefore, the electronic device determines that the current cell is the camping cell.

When the service type of the electronic device indicates that the a service registered by the electronic device is the delay-sensitive service, and the first message indicates that the NTN type in the backhaul link of the current cell is the GEO type, the electronic device determines that the current cell is the non-camping cell since the delay-sensitive service is not suitable to a long-delay backhaul link transmission such as the GEO, etc.

In another embodiment, when the first message indicates the NTN type of the backhaul link of the current cell, and the NTN type is, e.g., the GEO, LEO, etc., the electronic device determines that the current cell is the non-camping cell.

In some embodiments, when the network node is the TAB node, the first message is transmitted by the donor node to the network node and broadcast by the network node to the electronic device. For example, as shown in FIG. 4A, in the single hop scenario, a Radio Resource Control (RRC) layer of the IAB donor CU of the IAB donor generates the first message. The IAB donor then transmits the first message to the IAB node through the F1 interface, and the IAB node broadcasts the first message after receiving the first message. For another embodiment, as shown in FIG. 4B, when the network node is the TAB node 41, the RRC layer of IAB donor CU of the IAB donor 46 generates the first message. The first message is then transmitted to the TAB node 41 through the F1 interface, and the TAB node 41 broadcasts the first message after receiving the first message.

In the above embodiments, the first message is carried in any one of the following signaling: a RRC signaling, system information block 1 (SIB1), SIBx, master information block (MIB).

Based on this scheme, the first message may be transmitted flexibly through different signaling.

Figure 6:
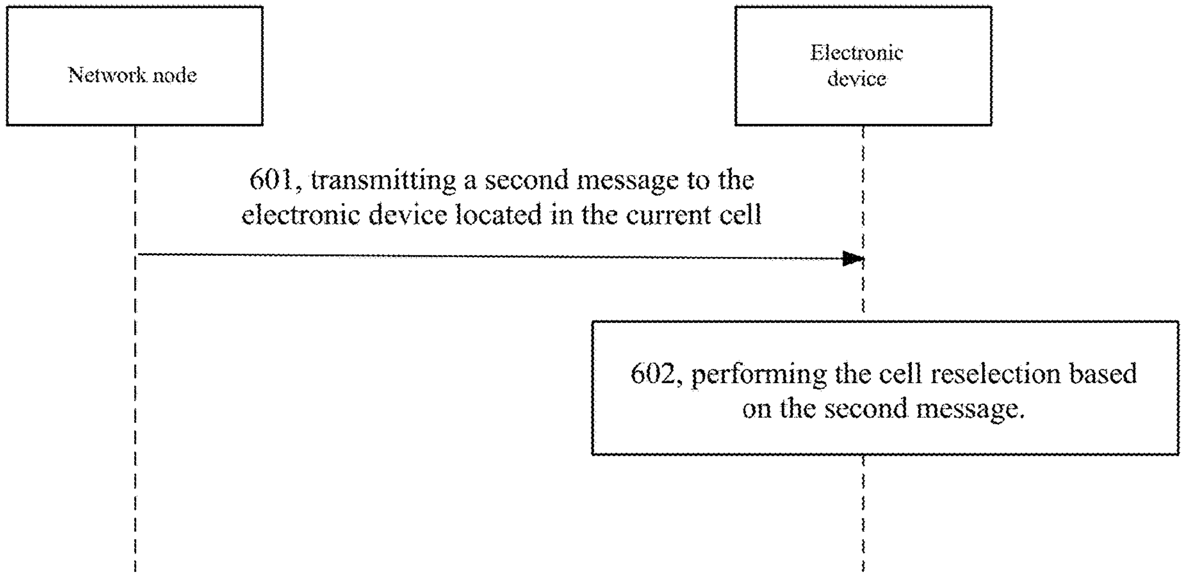
FIG. 6 is a flowchart of another cell determination method according to some embodiments of the present disclosure.

FIG. 6 is a flowchart of another cell determination method according to some embodiments of the present disclosure. The embodiment is described from the point of view of the electronic device interacting with the network node. This embodiment is configured for the cell reselection and includes operations 601-602.

In an operation 601, the network node transmits a second message to the electronic device located in the current cell.

The second message is configured to indicate whether the NTN exists in a backhaul link of the current cell and/or a backhaul link of a neighbor cell of the current cell. The backhaul link is the link between the backhaul-access integration TAB node and the donor node. For example, when the current cell is the cell served by the IAB node, the NTN may exist in the backhaul link of the current cell. When the neighbor cell is the cell served by the IAB node, the NTN may exist in the backhaul link of the neighbor cell.

In an operation 602, the electronic device performs the cell reselection based on the second message.

In embodiments of the present disclosure, the cell reselection indicates a process of the electronic device selecting a better cell providing a service signal by detecting signal qualities of the neighbor cell and the current cell in an idle mode (RRC_IDLE state) or in an inactive mode (RRC_INACTIVE state) and in combination with the second message, after the electronic device camps in the current cell. For example, when the second message indicates the NTN exists in the backhaul link of the current cell and no NTN exists in the backhaul link of the neighbor cell, even if the RSRP of the neighbor cell is inferior to the RSRP of the current cell, the electronic device performs the cell reselection, selects and access the neighbor cell, in response to the service type of the electronic device being the delay-sensitive service.

According to the cell determination method provided in the embodiments of the present disclosure, the network node transmits the second message to the electronic device in the current cell. The second message is configured to indicate whether the NTN exists in the backhaul link of the current cell and/or the backhaul link of the neighbor cell of the current cell. After the electronic device receives the second message, the electronic device performs the cell reselection based on the second message. Based on this scheme, since the electronic device is able to determine whether the NTN exists in the backhaul link of the current cell and/or the backhaul link of the neighbor cell of the current cell based on the second message, the electronic device is able to reselect a suitable cell to access based on a factor of whether the NTN exists in the backhaul link during the cell reselection. In this way, the service quality may be improved.

In some embodiments, when the electronic device performs the cell reselection based on the second message, the electronic device determines candidate cells from the current cell and/or the neighbor cell of the current cell to obtain a candidate cell set. The electronic device then performs the cell reselection for a candidate cell in the candidate cell set based on the second message.

In some embodiments, the network node may indicate whether the NTN exists in the backhaul link through one or more of the indication information, the delay, or the NTN type of the backhaul link.

In a manner, for each candidate cell in the candidate cell set, the NTN exists in the backhaul link of the candidate cell in response to the second message carrying indication information of the backhaul link of the candidate cell, and no NTN exists in the backhaul link of the candidate cell in response to the second message not carrying indication information.

In this manner, when no NTN exists in the backhaul link of the candidate cell, the second message does not carry the indication information of the backhaul link of the candidate cell, and the electronic device determines that no NTN exists in the backhaul link after receiving the second message. When the network node transmits the second message carrying the indication information, the electronic device determines that the NTN exists in the backhaul link after receiving the second message.

In another manner, for each candidate cell in the candidate cell set, the second message carries the indication information of the backhaul link of the candidate cell. The NTN exists in the backhaul link of the candidate cell in response to the indication information of the backhaul link being 1, and no NTN exists in the backhaul link of the candidate cell in response to the indication information of the backhaul link being 0. Or, the NTN exists in the backhaul link of the candidate cell in response to the indication information of the backhaul link being 0, and no NTN exists in the backhaul link of the candidate cell in response to the indication information of the backhaul link being 1.

In this manner, the indication information of each candidate cell is, for example, 1 bit. 1 indicates that the NTN exists in the backhaul link, while 0 indicates that no NTN exists in the backhaul link. Alternatively, 0 indicates that the NTN exists in the backhaul link, while 1 indicates that no NTN exists in the backhaul link.

In another manner, the second message carries a delay of the backhaul link of the candidate cell. The NTN exists in the backhaul link of the candidate cell in response to the delay being greater than a preset delay, and no NTN exists in the backhaul link of the candidate cell in response to the delay being less than or equal to the preset delay.

In this manner, the delay may be the specific delay length, such as 20 ms, 40 ms, etc., or may also be the delay level. For example, the delay is divided into two levels according to the delay length. The first level indicates the delay greater than or equal to 20 ms, which is denoted by 0, and the second level indicates a delay less than 20 ms, which is denoted by 1. In this way, for each candidate cell, 1 bit is able to denote the delay information, which reduces a signaling overhead somehow.

In another manner, the NTN exists in the backhaul link of the candidate cell in response to the second message carrying the NTN type, and no NTN exists in the backhaul link of the candidate cell in response to the second message not carrying NTN type.

In this manner, the NTN type is, e.g., 2 bit, and the NTN type is, e.g., the GEO, LEO, etc.

Based on this scheme, the network node may flexibly indicate to the electronic device whether the NTN exists in the backhaul link of the current cell and/or the backhaul link of the neighbor cell through the indication information, the delay, or the NTN type.

Although the indication information, the delay, or the NTN type are taken as examples to illustrate the second message in the above. However, the embodiments of the present disclosure are not limited thereto. In other feasible implementations, the second message may also carry one or more of the indication information, the delay, or the NTN type. For example, the second message carries both the NTN type and the indication information. In this case, the electronic device determines that the NTN exists in the backhaul link based on the indication information, and further determines that the NTN in the backhaul link is the LEO or GEO, etc., based on the NTN type.

In the above embodiment, the to-be-selected cell is required to be measured in the process of the cell reselection, in order to perform the channel-quality assessing process and determine whether the camping condition is satisfied. When the camping condition is satisfied, whether to camp is determined in combination with the second message. For example, the electronic device camps in the current cell, when the neighbor cell has a better signal quality, whether to camp in the neighbor cell is determined in combination with the second message. A cell reselection method provided in the embodiments of the present disclosure is described in detail in the following.

The cell reselection is divided into a same-frequency cell reselection and a heterodyne cell reselection. The same-frequency cell reselection may solve a wireless coverage problem. The heterodyne cell reselection can not only solve the wireless coverage problem, but also achieve a load balance by setting priorities of different frequency points.

In the process of the cell reselection, the electronic device selects a better cell to camp in by detecting the signal qualities of the neighbor cell and the current cell in the RRC_IDLE state or the RRC_INACTIVE state and in combination with the second message. After the electronic device successfully camps in the current cell through the cell selection process, the electronic device will continuously perform a cell measurement process for the current cell, determine whether to initiate a neighbor-cell measurement. In the process of the neighbor-cell measurement, when both the signal quality and an electrical level of the neighbor cell satisfy the first criterion and satisfy a certain reselection determination criterion, the electronic device will abandon the current cell and camp in the neighbor cell. The reselection determination criterion is, e.g., a second criterion, which is also referred to as an R criterion, etc.

The Radio Resource Control (RRC) layer of the electronic device calculates Srxlev/Squal based on measurement results of the RSRP and RSRQ, which may refer to a description related to the first criterion in the cell selection described above and is not repeated herein. The electronic device determines whether to initiate the neighbor-cell measurement based on the calculated Srxlev/Squal.

When the neighbor-cell measurement is a same-frequency measurement, the electronic device compares Srxlev and $S_{IntmSearchP}$, and compares Squal and $S_{IntmSearchQ}$. The $S_{IntmSearchQ}$ and $S_{IntraSearchP}$ are initiating thresholds of the same-frequency measurement.

When the neighbor-cell measurement is a heterodyne or heterosystem measurement, the electronic device compares Srxlev and $S_{nonIntraSearchP}$, and compares Squal and $S_{nonIntmSearchQ}$. $S_{nonIntraSearchQ}$ and $S_{nonIntmSearchP}$ are initiating thresholds of the heterodyne or heterosystem measurement.

A determination process of whether to initiate the same-frequency measurement or the heterodyne measurement is shown in Table 2.

TABLE 2

| Measurement type | Measurement initiating conditions |
|---|---|
| Same-frequency | Srxlev > $S_{IntraSearchP}$ and Squal > $S_{IntraSearchQ}$ (non-cell edge)<br>When the condition is satisfied, the same-frequency measurement may be not started, otherwise the same-frequency measurement should be started |
| Heterodyne or hetero-system | For a high-priority frequency and RAT, the heterodyne measurement or a heterosystem frequency measurement should be initiated less than (or equal to, only for NR heterodyne) a current serving cell reselection priority, if Srxlev > $S_{nonIntraSearchP}$ and Squal > $S_{nonIntraSearchQ}$ (non-cell edge),<br>the measurement may be not initiated, otherwise the measurement should be initiated |

When the electronic device meets the condition of starting the same-frequency measurement, the electronic device performs the same-frequency measurement for the neighbor cell of the current cell to obtain the candidate cell set. When the electronic device satisfies the condition of the heterodyne measurement, the electronic device performs the heterodyne measurement for the neighbor cell of the current cell to obtain the candidate cell set. The electronic device then ranks the cells in the candidate cell set according to a certain criterion (as shown in Table 3), and selects the suitable cell to camp in according to the ranking.

TABLE 3

| Relection target frequency | Relection conditions |
|---|---|
| High-priority frequency (NR or the hetero-system) | the following conditions are always satisfied in a $Treselection_{RAT}$ interval:<br>candidate cell Squal > $Thresh_{X, HighQ}$ (threshServingLowQ being broadcast in the SIB2)<br>candidate cell Srxlev > $Thresh_{X, HighP}$ (threshServingLowQ being not broadcast)<br>a duration of UE camping the current serving cell being greater than 1 second |
| Same frequency or same-priority frequency | Ranking according to the second criterion, a new cell having a better signal quality than the current cell and lasting for a time length of $Treselection_{RAT}$, and the duration of UE camping in the current serving cell being greater than 1 second |
| Low-priority frequency (NR or the hetero-system) | the following conditions are always satisfied in a TreselectionRAT interval:<br>current serving cell Squal < $Thresh_{Serving, LowQ}$, and candidate cell Squal > $Thresh_{X, LowQ}$ (threshServingLowQ being broadcast)<br>current serving cell Srxlev < $Thresh_{Serving, LowP}$, and candidate cell Srxlev > $Thresh_{X, LowP}$ (threshServingLowQ being not broadcast)<br>the duration of UE camping in the current serving cell being greater than 1 second |

In the Table 3, the $Treselection_{RAT}$ indicates the time interval. The $ThreshX,_{HighQ}$ and $ThreshX,_{HighP}$ are broadcast by the network side to the electronic device.

In the process of the cell reselection, when multiple neighbor cells with different priorities satisfy a reselection criterion at the same time, the high-priority frequency takes precedence over the low-priority frequency, and a high-priority RAT takes precedence over a low-priority RAT.

In the above Table 3, when frequencies of the current cell and each neighbor cell are the same frequencies or the equal-priority frequencies, the current cell and the neighbor cells are ranked according to the second criterion. The second criterion, i.e., the R criterion, is as follows:

Current cell: $Rs=Q_{meas,s}+Q_{hyst}-Qoffset_{temp}$

Neighbor cells: $Rn=Qmeas,n-Qoffset-Qoffset_{temp}$.

The meaning of each parameter in the above formulas is shown in Table 4.

TABLE 4

| | |
|---|---|
| $Q_{meas}$ | the RSRP measuring quantity of the cell reselection |
| Qoffset | an offset value of the cell reselection, notified in the system broadast<br>for the same-frequency measurement, if $Qoffset_{s,n}$ is valid, $Qoffset = Qoffset_{s,n}$; if the $Qoffset_{s,n}$ is invalid, Qoffset = 0.<br>for the heterodyne measurement, if $Qoffset_{s,n}$ is valid, $Qoffset = Qoffset_{s,n} + Qoffset_{frequency}$; if the $Qoffset_{s,n}$ is invalid, $Qoffset = Qoffset_{frequency}$. |
| $Qoffset_{temp}$ | a temporary offset value, notified in system broadcast |
| $Q_{hyst}$ | a cell-reselection hysteresis value, configured to adjust reselection difficulty and reduce the ping-pong effect, notified in the system broadcast |

In the above formulas, $Q_{meas,s}$ denotes the RSRP measurement quantity of the current cell and $Q_{meas,n}$ denotes the RRSP measurement quantity of the neighbor cell.

In the embodiments of the present disclosure, after the electronic device camps in the current cell, the electronic device continuously measures the current cell to obtain a measurement result. The electronic device determines whether to initiate the neighbor-cell measurement based on the measurement result, and determination bases are shown in the Table 2. The electronic device performs the measurement for the neighbor cell of the current cell in response to the measurement result indicating to initiate the neighbor-cell measurement. Initiating the neighbor-cell measurement includes initiating the same-frequency measurement, initiating the heterodyne measurement or the heterosystem measurement, etc.

In the neighbor cell initiating the measurement, when a reselection target frequency is the same frequency or the equal-priority frequency, the current cell and the neighbor cell are ranked according to the second criterion, and the candidate cell set is obtained based on the ranking result. The reselection target frequency being the same frequency or the equal-priority frequency indicates that the frequency of the neighbor cell is the same with the frequency of the current cell; or, a priority of the frequency of the neighbor cell is the same with a priority of the frequency of the current cell. After the electronic device ranks the current cell and the neighbor cell according to the second criterion and obtains the candidate cell set, the electronic device further selects the camping cell through rangeToBestCell. Further selecting the camping cell through the rangeToBestCell indicates to select all candidate cells having a difference from a R value of the cell having the best signal quality within a rangeToBestCell to obtain the candidate cell set.

In subsequence, the electronic device selects the suitable cell to be the camping cell from the candidate cell set according to the second message. During the selection process, the candidate cell without the NTN and having the maximum number of beams having signal quality values satisfying a threshold is preferred to select. When the NTN exists in the backhaul link of each candidate cell in the candidate cell set, the candidate cell which has the maximum number of beams having the signal quality values satisfying the threshold is determined from the candidate cell set to be the camping cell.

For example, the backhaul link of the current cell includes the NTN, a backhaul link of a candidate cell A does not include the NTN. The candidate cell A includes 4 beams, and the signal quality values of the 4 beams all exceed a threshold. The backhaul link of the candidate cell B does not include the NTN. Although the candidate cell B includes 6 beams, the signal quality values of only 2 of the 6 beams exceed the threshold. Therefore, the electronic device selects the candidate cell A to be the camping cell.

Based on this scheme, a suitable camping cell is selected in the same-frequency measurement, such that a purpose of improving the service quality is achieved.

In the process of the cell reselection, the number of the IAB nodes is one or more. The network node is an IAB node of the one or more IAB nodes, and the current cell is a cell served by the IAB node transmitting the second message.

For example, as shown in FIG. 4B, the network node is the IAB node**4*l*, and the NTN exists in the backhaul link of the current cell. Since no NTN exists in the backhaul link of the IAB node42** serving for the neighbor cell, the electronic device selects the neighbor cell to be the camping cell.

When the network node is the IAB node42, no NTN exists in the backhaul link of the current cell. Since the NTN exists in the backhaul link of the IAB node41 serving the neighbor cell, the electronic device selects the current cell to be the camping cell.

In the process of the cell reselection, when the network node serving the current cell is the IAB node, if the NTN exists in the backhaul link of the current cell or the backhaul link of the neighbor cell, the second message carries one or more of the indication information, the delay of the backhaul link, and the NTN type of the backhaul link, which are configured to indicate whether the NTN exists in the backhaul link. For each backhaul link, such as the backhaul link of the current cell or the backhaul link of the neighbor cell, the indication information configured to indicate whether the NTN exists in that backhaul link is, e.g., 1 bit. 1 indicates that the NTN exists therein, while 0 indicates that no NTN exists therein. The NTN type is, e.g., 2 bits, and the NTN type is, e.g., the GEO, LEO, etc. The delay may be the specific delay length, such as 20 ms, 40 ms, etc., or may also be the delay level. For example, the delay is divided into two levels according to the delay length. The first level indicates that the delay is greater than or equal to 20 ms, which is denoted by 0, and the second level indicates that the delay is less than 20 ms, which is denoted by 1. In this way, for each candidate cell, 1 bit is able to denote the delay information, which reduces the signaling overhead somehow.

Based on this scheme, the network node may flexibly indicate to the electronic device whether the NTN exists in the backhaul link of the current cell and/or the backhaul link of the neighbor cell.

In the process of the cell reselection, the number of the TAB nodes is one or more, and the network node may also not support the IAB technology. As shown in FIG. 4B, the network node is the gNB43 or the eNB44. The current cell is a cell served by the network node not supporting the IAB technology. In this case, no NTN exists in the backhaul link of the current cell, while the NTN exists in the backhaul link of the neighbor cell. In this case, the second message indicates whether the NTN exists in the backhaul link of the neighbor cell, and the neighbor cell is a cell served by the IAB node of the one or more IAB nodes.

The cell reselection process is described in detail through some embodiments in the following.

In an embodiment, the electronic device performs the measurement for the current cell and determines whether to initiate the neighbor-cell measurement based on the measurement result. When the neighbor-cell measurement is initiated and the reselection target frequency is the same frequency or the equal-priority frequency, the electronic device ranks the current cell and the neighbor cells based on the second criterion and further selects the camping cells from the ranking result through the rangeToBestCell to obtain the candidate cell set. In the reselection process, based on the second message, the electronic device determines the candidate cell of which a backhaul link exists no NTN and which has the maximum number of beams having the signal quality values satisfying the threshold from the candidate cell set, as the camping cell. In response to the second message indicating the NTN existing in the backhaul link of each candidate cell in the candidate cell set, the candidate cell which has the maximum number of beams having the signal quality values satisfying the threshold is determined from the candidate cell set to be the camping cell.

For example, as shown in FIG. 4B, in the process of the cell reselection, when the network node is the IAB node41, the neighbor cell served by the IAB node42, the neighbor cell served by the gNB43, the neighbor cell served by the eNB44, and the current cell are the same-frequency cells or the same-priority frequency cells. The electronic device determines that the NTN exists in the backhaul link between the TAB node41 and the IAB donor46 based on the second message, no NTN exists in the backhaul link between the IAB node42 and the IAB donor46, and the number of the beams having the signal quality values greater than the threshold in the neighbor cell served by the TAB node42 is more than that in the cell served by the gNB43 or the eNB44. In this case, the electronic device determines that the neighbor cell served by the IAB node42 is the camping cell.

When the network node is the IAB node42, the neighbor cell served by the IAB node41, the neighbor cell served by the gNB43, the neighbor cell served by the eNB44, and the current cell are the same-frequency cells or the same-priority frequency cells. The electronic device determines that the NTN exists in the backhaul link between the IAB node41 and the IAB donor46 based on the second message, and no NTN exists in the backhaul link between the IAB node42 and the IAB donor46. That is, no NTN exists in the backhaul link of the current cell and the NTN exists in the backhaul link of the neighbor cell. In this case, when the number of the beams having the signal quality values satisfying the threshold in the neighbor cell served by the gNB43 is greater than that in the neighbor cell served by IAB node42 or by eNB44, the electronic device determines that the neighbor cell served by the gNB43 is the camping cell.

In addition, when NTN exists in the backhaul link of each candidate cell in the candidate cell set, the electronic device selects the candidate cell which has the maximum number of beams having the signal quality values satisfying the threshold from the candidate cell set to be the camping cell. For example, one candidate cell has 5 beams, and 4 of the 5 beams meet the threshold, while another candidate cell has 6 beams, and 2 of the 6 beams meet the threshold, the electronic device determines that the candidate cell having 5 beams is the camping cell.

In another embodiment, the electronic device performs the measurement for the current cell and determines whether to initiate the neighbor-cell measurement based on the measurement result. When the neighbor-cell measurement is initiated and the reselection target frequency is the same frequency or the equal-priority frequency, the electronic device ranks the current cell and the neighbor cells based on the second criterion and further selects the camping cell from the ranking result through the rangeToBestCell to obtain the candidate cell set. In the reselection process, the electronic device determines a candidate cell with the shortest delay in the backhaul link to be the camping cell from the candidate cell set based on the second message.

For example, when the NTN exists in the backhaul link of each candidate cell in the candidate cell set, the electronic device determines the candidate cell with the shortest delay in the backhaul link to be the camping cell.

In addition, the electronic device may combine the delay and the number of the beams to determine the camping cell. Whether the electronic device relies on the delay alone or a combination of the two to determine the camping cell is configured by a network. In response to combining the two to determine the camping cell, when the NTN exists in the backhaul link of each candidate cell in the candidate cell set, the electronic device determines a candidate cell having the maximum number of the beams having the signal quality values satisfying the threshold and having the shortest delay to be the camping cell. For example, there are 3 candidate cells, and delays of these 3 candidate cells are 20 ms, 20 ms, 80 ms, respectively. The numbers of beams of two candidate cells with delays of 20 ms are 6 and 4, respectively, while the numbers of the beams having the signal quality values satisfying the threshold are 2 and 4, respectively. The number of beams of the candidate cell with a delay of 80 ms is 6, while 3 of the 6 beams have the signal quality values satisfying the threshold. In this case, the electronic device determines that the candidate cell having the delay of 20 ms and 4 beams to be the camping cell.

In another embodiment, the electronic device performs the measurement for the current cell and determines whether to initiate the neighbor-cell measurement based on the measurement result. When the neighbor-cell measurement is initiated and the reselection target frequency is the same frequency or the equal-priority frequency, the electronic device ranks the current cell and the neighbor cells based on the second criterion and further selects the camping cell from the ranking result through the rangeToBestCell to obtain the candidate cell set. When the NTN exists in the backhaul link of each candidate cell in the candidate cell set, the electronic device determines device characteristic of the electronic device itself and performs the cell reselection based on the device characteristic of the electronic device. The electronic device may determine the device characteristic of the electronic device based on the service type and/or the terminal type, etc. of the electronic device.

In response to the device characteristic indicating that the electronic device is the delay-insensitive device, the electronic device determines the candidate cell which has the maximum number of beams having the signal quality values satisfying the threshold from the candidate cell set to be the camping cell. In response to the device characteristic indicating that the electronic device is the delay-sensitive device, the electronic device determines that the candidate cell in the candidate cell set is the non-camping cell.

For example, as shown in FIG. 4B, when the network node is the IAB node41, the electronic device determines that the NTN exists in the backhaul link between the IAB node41 and the IAB donor46 based on the second message, and no NTN exists in the backhaul link of the neighbor cell served by the eNB 44 or the gNB43. In subsequence, the electronic device determines whether to camp in the neighbor cell based on the terminal type, the service type, etc. The service type of the electronic device is the delay-sensitive service. The electronic device camps in the current cell served by the IAB node 41. When the RSRP of the neighbor cell served by the gNG43 meets the camping condition, even if the RSRP of the neighbor cell is inferior to the RSRP of the current cell, the electronic device camps in the neighbor cell after the cell reselection, such that a service delay may be ensured.

For another embodiment, when the electronic device is a delay-insensitive device, the electronic device camps in the current cell served by the IAB node42. When the neighbor cell served by the IAB node41 satisfies the first criterion, the electronic device camps in the neighbor cell after the cell reselection.

For example, when the network node is the eNB44, the electronic device determines that the NTN exists in the backhaul link of the neighbor cell served by the IAB node41 based on the second message, and no NTN exists in the backhaul links of the neighbor cells served by the gNB43 and the IAB node42. Subsequently, the electronic device determines whether to camp in the neighbor cell based on the terminal type, the service type, etc.

Similarly, in the process of the cell reselection, when the network node is the gNB43, the electronic device determines the NTN exists in the backhaul link of the neighbor cell served by the IAB node41 based on the second message, and no NTN exists in the backhaul links of the neighbor cells served by the eNB44 and the IAB node42. Subsequently, the electronic device determines whether to camp in the neighbor cell based on the terminal type, the service type, etc.

In another embodiment, after the electronic device determines the candidate cell set, when the second message indicates the NTN type of the backhaul link of each candidate cell in the candidate cell set, the candidate cell having the maximum number of beams having the signal quality values satisfying the threshold is determined from the candidate cell set to be the camping cell. For example, the electronic device camps in the current cell served by the IAB node41, the candidate cells include the current cell and a neighbor cell. When the second message indicates that the NTN exists in the backhaul link of each candidate cell, the electronic device camps in the neighbor cell in response to the number of the beams having the signal quality values satisfying the threshold in the neighbor cell being greater than that in the current cell.

In some embodiments, when the network node is the IAB node, the second message is transmitted from the donor node to the network node and broadcast by the network node to the electronic device. For example, as shown in FIG. 4B, when the network node is the IAB node41, i.e., when the current cell is a cell served by the IAB node41, the RRC layer of the IAB donor CU of the IAB donor46 generates the second message. The second message is then transmitted to the IAB node41 through the F1 interface. After receiving the second message, the IAB node41 broadcasts the second message.

In some embodiments, the second message is carried in any one of the following signaling: the RRC signaling, the SIB1, the SIBx, and the MIB.

Based on this scheme, the second message may be transmitted flexibly through different signaling.

The apparatus embodiments of the present disclosure are described in the following and are configured to perform the method embodiments of the present disclosure. The details not disclosed in the apparatus embodiments of the present disclosure may refer to the method embodiments of the present disclosure.

Figure 7:
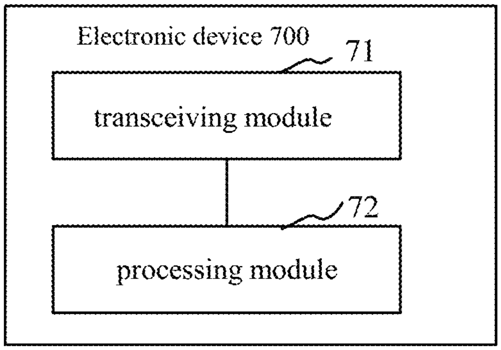
FIG. 7 is a schematic view of a cell determination apparatus according to some embodiments of the present disclosure.

FIG. 7 is a schematic view of a cell determination apparatus according to some embodiments of the present disclosure. A cell determination apparatus 700 is integrated in the electronic device described above to enable the electronic device to implement the cell selection method described above. The cell determination apparatus 700 includes a transceiving module 71 and a processing module 72.

The transceiving module 71 is configured to receive a first message from a network node at a current cell, wherein the first message is configured to indicate whether a Non Terrestrial Network (NTN) exists in a backhaul link of the current cell.

The processing module 72 is configured to perform a cell selection based on the first message.

In an embodiment, the NTN exists in the backhaul link in response to the first message carrying indication information, and no NTN exists in the backhaul link in response to the first message not carrying indication information.

In an embodiment, the first message carries indication information of the backhaul link; wherein the NTN exists in the backhaul link in response to the indication information of the backhaul link being 1, and no NTN exists in the backhaul link in response to the indication information of the backhaul link being 0; or the NTN exists in the backhaul link in response to the indication information of the backhaul link being 0, and no NTN exists in the backhaul link in response to the indication information of the backhaul link being 1.

In an embodiment, the first message carries a delay of the backhaul link; wherein the NTN exists in the backhaul link in response to the delay being greater than a preset delay, and no NTN exists in the backhaul link in response to the delay being less than or equal to the preset delay.

In an embodiment, the NTN exists in the backhaul link in response to the first message carrying a NTN type, and no NTN exists in the backhaul link in response to the first message not carrying NTN type.

In an embodiment, the processing module 72 is configured to determine that the current cell is a non-camping cell in response to the NTN existing in the backhaul link; and determine that the current cell is a camping cell in response to no NTN existing in the backhaul link.

In an embodiment, the processing module 72 is configured to determine device characteristic of an electronic device in response to the NTN existing in the backhaul link; and perform the cell selection based on the device characteristic of the electronic device.

In an embodiment, the processing module 72 is configured to determine that the current cell is a camping cell in response to the device characteristic indicating that the electronic device is a delay-insensitive device; and determine that the current cell is a non-camping cell in response to the device characteristic indicating that the electronic device is a delay-sensitive device.

In an embodiment, the processing module 72 is configured to perform the cell selection for the current cell based on the first message in response to the current cell satisfying a first criterion, wherein the first criterion is a condition satisfied by a RSRP and a RSRQ of the current cell.

In an embodiment, the processing module 72 is configured to the network node is an IAB node, and the current cell is a cell served by the IAB node.

In an embodiment, the transceiving module 71 is configured to receive the first message from a donor node and forwarded via the IAB node, wherein the donor node is a donor node of the IAB node.

In an embodiment, the first message is carried in any one of following signaling: a RRC signaling, SIB1 and SIBx, and MIB.

Figure 8:
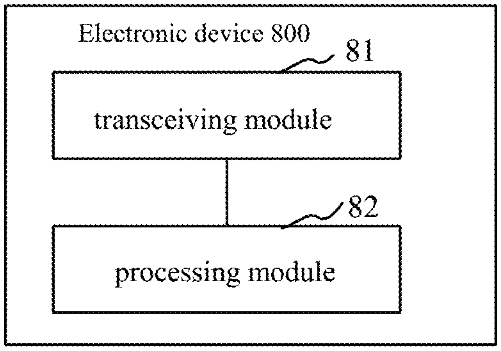
FIG. 8 is a schematic view of another cell determination apparatus according to some embodiments of the present disclosure.

FIG. 8 is a schematic view of another cell determination apparatus according to some embodiments of the present disclosure. The cell determination apparatus 800 is integrated in the electronic device described above to enable the electronic device to implement the above cell reselection method. The cell determination apparatus 800 includes a transceiving module 81 and a processing module 82.

The transceiving module 81 is configured to receive a second message from a network node at a current cell, wherein the second message is configured to indicate whether a Non Terrestrial Network (NTN) exists in a backhaul link of the current cell and/or a backhaul link of a neighbor cell of the current cell.

The processing module 82 is configured to perform a cell reselection based on the second message.

In an embodiment, the processing module 82 is configured to determine candidate cells from the current cell and/or the neighbor cell of the current cell to obtain a candidate cell set; and perform the cell reselection for a candidate cell in the candidate cell set based on the second message.

In an embodiment, the NTN exists in the backhaul link of the candidate cell in response to the second message carrying indication information, and no NTN exists in the backhaul link of the candidate cell in response to the second message not carrying indication information.

In an embodiment, the second message carries indication information of a backhaul link of the candidate cell; wherein the NTN exists in the backhaul link of the candidate cell in response to the indication information of the backhaul link being 1, and no NTN exists in the backhaul link of the candidate cell in response to the indication information of the backhaul link being 0; or the NTN exists in the backhaul link of the candidate cell in response to the indication information of the backhaul link being 0, and no NTN exists in the backhaul link of the candidate cell in response to the indication information of the backhaul link being 1.

In an embodiment, the second message carries a delay of the backhaul link of the candidate cell; wherein the NTN exists in the backhaul link of the candidate cell in response to the delay being greater than a preset delay, and no NTN exists in the backhaul link of the candidate cell in response to the delay being less than or equal to the preset delay.

In an embodiment, the NTN exists in the backhaul link of the candidate cell in response to the second message carrying a NTN type, and no NTN exists in the backhaul link of the candidate cell in response to the second message not carrying NTN type.

In an embodiment, the processing module 82 is configured to determine, based on the second message, a candidate cell of which a backhaul link exists no NTN and which has the maximum number of beams having signal quality values satisfying a threshold from the candidate cell set, to be a camping cell; and determine a candidate cell which has the maximum number of beams having the signal quality values satisfying the threshold from the candidate cell set to be the camping cell, in response to the NTN existing in the backhaul link of each candidate cell in the candidate cell set.

In an embodiment, the processing module 82 is configured to determine a candidate cell having a backhaul link with the shortest delay from the candidate cell set to be a camping cell based on the second message.

In an embodiment, the processing module 82 is configured to determine a candidate cell which has the maximum number of beams having signal quality values satisfying a threshold from the candidate cell set to be a camping cell, in response to the second message carrying the NTN type of the backhaul link of each candidate cell in the candidate cell set.

In an embodiment, the processing module 82 is configured to determine device characteristic of an electronic device in response to the second message indicating that a backhaul link of the candidate cell exists the NTN; and perform the cell reselection based on the device characteristic of the electronic device.

In an embodiment, during performing the cell reselection based on the device characteristic of the electronic device, the processing module is configured to determine that a candidate cell which has the maximum number of beams having signal quality values satisfying a threshold from the candidate cell set to be a camping cell, in response to the device characteristic indicating that the electronic device is a delay-insensitive device; and determine that the candidate cell in the candidate cell set is a non-camping cell in response to the device characteristic indicating that the electronic device is a delay-sensitive device.

In an embodiment, in the determining candidate cells from the current cell and/or the neighbor cell of the current cell to obtain a candidate cell set, the processing module is configured to perform a cell measurement for the current cell and obtaining a measurement result; determine whether to initiate a neighbor-cell measurement based on the measurement result; and perform the neighbor-cell measurement for the neighbor cell of the current cell to obtain the candidate cell set, in response to the measurement result indicating to initiate the neighbor-cell measurement; wherein the neighbor cell has the same frequency as the current cell, or the neighbor cell has the same priority of a frequency as the current cell.

In an embodiment, the network node is an IAB node of one or more IAB nodes, the current cell is a cell served by a first IAB node transmitting the second message, and the neighbor cell is served by any one of the one or more IAB nodes other than the first IAB node.

In an embodiment, the transceiving module is configured to receive the second message transmitted from a donor node and forwarded via the first IAB node, wherein the donor node is a donor node of the first IAB node.

In an embodiment, the network node does not support an IAB technology, the current cell is a cell served by the network node, and the neighbor cell is a cell served by an IAB node.

In an embodiment, the second message is carried in any one of following signaling: a RRC signaling, SIB1 and SIBx, and MIB.

The cell determination apparatuses provided in FIG. 7 and FIG. 8 may implement actions of the electronic device in the above embodiments. An implementation principle and a technical effect of the cell determination apparatuses are similar to those of the electronic device, which are not repeated herein.

Figure 9:
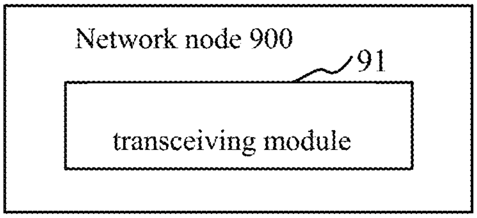
FIG. 9 is a schematic view of another cell determination apparatus according to some embodiments of the present disclosure.

FIG. 9 is a schematic view of another cell determination apparatus according to some embodiments of the present disclosure. The cell determination apparatus 900 is integrated in the above network to enable the network node to transmit the first message. The cell determination apparatus 900 includes a transceiving module 91.

The transceiving module 91 is configured to transmit the first message to an electronic device located in a current cell, wherein the first message is configured to indicate whether a Non Terrestrial Network (NTN) exists in a backhaul link of the current cell.

In an embodiment, the NTN exists in the backhaul link in response to the first message carrying indication information, and no NTN exists in the backhaul link in response to the first message not carrying indication information.

In an embodiment, the first message carries indication information of the backhaul link; wherein the NTN exists in the backhaul link in response to the indication information of the backhaul link being 1, and no NTN exists in the backhaul link in response to the indication information of the backhaul link being 0; or the NTN exists in the backhaul link in response to the indication information of the backhaul link being 0, and no NTN exists in the backhaul link in response to the indication information of the backhaul link being 1.

In an embodiment, the first message carries a delay of the backhaul link; wherein the NTN exists in the backhaul link in response to the delay being greater than a preset delay, and no NTN exists in the backhaul link in response to the delay being less than or equal to the preset delay.

In an embodiment, the NTN exists in the backhaul link in response to the first message carrying a NTN type, and no NTN exists in the backhaul link in response to the first message not carrying NTN type.

In an embodiment, the network node is an IAB node, and the current cell is a cell served by the IAB node.

In an embodiment, before transmitting the first message to the electronic device located in the current cell, the transceiving module 91 is further configured to receive the first message transmitted from a donor node, and the donor node is a donor node of the IAB node.

In an embodiment, the first message is carried in any one of following signaling: a RRC signaling, SIB1 and SIBx, and MIB.

Figure 10:
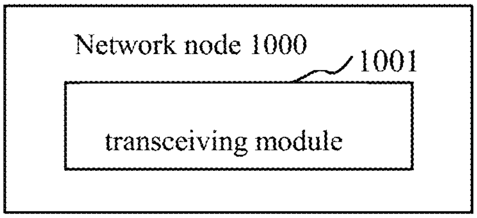
FIG. 10 is a schematic view of yet another cell determination apparatus according to some embodiments of the present disclosure.

FIG. 10 is a schematic view of yet another cell determination apparatus according to some embodiments of the present disclosure. The cell determination apparatus 1000 is integrated in the above network to enable the network node to transmit a second message and includes a transceiving module 1001.

The transceiving module 1001 is configured to transmit a second message to an electronic device located in a current cell, wherein the second message is configured to indicate whether a Non Terrestrial Network (NTN) exists in a backhaul link of the current cell and/or a backhaul link of a neighbor cell of the current cell.

In an embodiment, the NTN exists in a backhaul link of the candidate cell in response to the second message carrying indication information, and no NTN exists in the backhaul link of the candidate cell in response to the second message not carrying indication information; wherein the candidate cell is any one of candidate cells in a candidate cell set, and the candidate cell set is determined based on the current cell and/or the neighbor cell.

In an embodiment, the second message carries indication information of a backhaul link of the candidate cell; wherein the NTN exists in the backhaul link of the candidate cell in response to the indication information of the backhaul link being 1, and no NTN exists in the backhaul link of the candidate cell in response to the indication information of the backhaul link being 0; or the NTN exists in the backhaul link of the candidate cell in response to the indication information of the backhaul link being 0, and no NTN exists in the backhaul link of the candidate cell in response to the indication information of the backhaul link being 1.

In an embodiment, the second message carries a delay of the backhaul link of the candidate cell; wherein the NTN exists in the backhaul link of the candidate cell in response to the delay being greater than a preset delay, and no NTN exists in the backhaul link of the candidate cell in response to the delay being less than or equal to the preset delay.

In an embodiment, the NTN exists in the backhaul link of the candidate cell in response to the second message carrying a NTN type, and no NTN exists in the backhaul link of the candidate cell in response to the second message not carrying NTN type.

In an embodiment, the network node is an IAB node of one or more IAB nodes, the current cell is a cell served by a first IAB node transmitting the second message, and the neighbor cell is served by any one of the one or more IAB nodes other than the first IAB node.

In an embodiment, before transmitting the second message to the electronic device located in the current cell, the transceiving module 1001 is further configured to receive the second message transmitted from a donor node, and the donor node is a donor node of the IAB node.

In an embodiment, the network node does not support an IAB technology, the current cell is a cell served by the network node, and the neighbor cell is a cell served by an IAB node.

In an embodiment, the second message is carried in any one of following signaling: a RRC signaling, SIB1 and SIBx, and MIB.

The cell determination apparatuses provided in FIG. 9 and FIG. 10 may implement actions of the network node in the above embodiments. Implementation principles and technical effects of the cell determination apparatuses are similar to those of the electronic device, which are not repeated herein.

Figure 11:
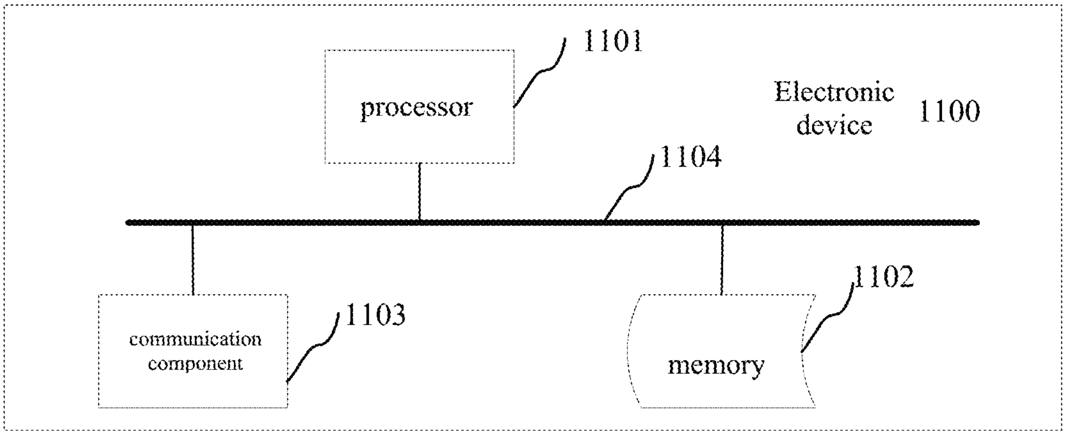
FIG. 11 is a structural schematic view of an electronic device according to some embodiments of the present disclosure.

FIG. 11 is a structural schematic view of an electronic device according to some embodiments of the present disclosure. As shown in FIG. 11, the electronic device 1100 includes a processor 1101 and a memory 1102.

The memory 1102 stores computer instructions.

The processor 1101 executes the computer instructions store in the memory 1102 to enable the processor 1101 to implement the above method performed by the electronic device.

A specific implementation process of the processor 1101 may refer to the above method embodiments. An implementation principle and a technical effect of the processor 1101 are similar to those described in the method embodiments, which are not repeated herein.

In an embodiment, the electronic device 1100 may include a communication component 1103. The processor 1101, the memory 1102, and the communication component 1103 may be connected through a bus 1104.

Figure 12:
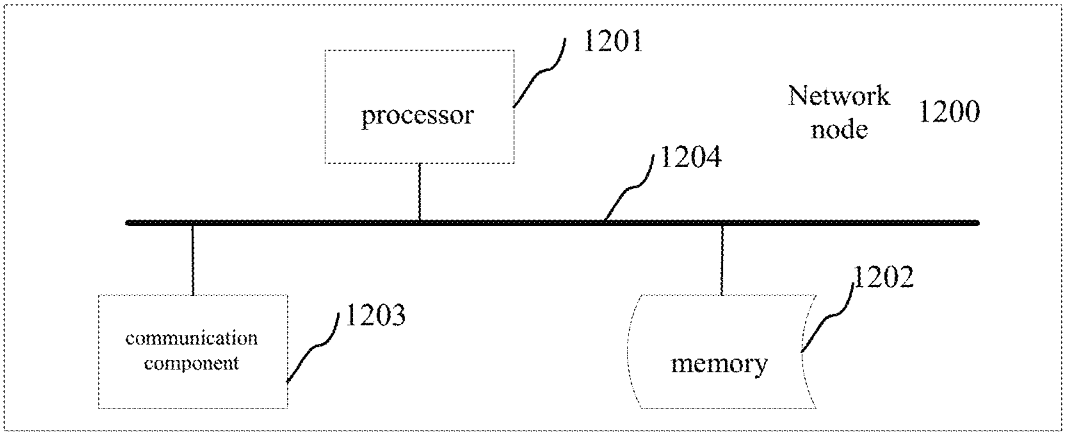
FIG. 12 is a structural schematic view of a network node according to some embodiments of the present disclosure.

FIG. 12 is a structural schematic view of a network node according to some embodiments of the present disclosure. As shown in FIG. 12, the network node 1200 includes a processor 1201 and a memory 1202.

The memory 1202 stores computer instructions.

The processor 1201 implements the computer instructions stored in the memory 1201 to enable the method performed by the network node described above.

A specific implementation process of the processor 1201 may refer to the above method embodiments. An implementation principle and a technical effect of the processor 1201 are similar to those described in the method embodiments, which are not repeated in this embodiment.

In an embodiment, the network node 1200 may include a communication component 1203. The processor 1201, the memory 1202, and the communication component 1203 may be connected through a bus 1204.

A computer-readable storage medium is provided in this embodiment and stores computer instructions. When the computer instructions are implemented by a processor, the method performed by the electronic device may be implemented described above.

A computer-readable storage medium is provided in this embodiment and stores computer instructions. When the computer instructions are implemented by a processor, the method performed by the network node may be implemented described above.

A computer program product is further provided in this embodiment and stores a computer program. When the computer program is implemented by a processor, the method performed by the electronic device may be implemented described above.

A computer program product is further provided in this embodiment and stores a computer program. When the computer program is implemented by a processor, the method performed by the network node may be implemented described above.

A chip is further provided in this embodiment. The chip is coupled to a memory in the electronic device to enable the chip to run program instructions stored in a memory during running, such that the electronic device implements each process of the electronic device as described in the above method embodiments.

A chip is further provided in this embodiment. The chip is coupled to a memory in the network node to enable the chip to run program instructions stored in a memory during running, such that the network node implements each process of the network node as described in the above method embodiments.

The above embodiments may be achieved in whole or in part through a software, a hardware, a firmware, or any combination thereof. When implemented by the software, it may be implemented in whole or in part in a form of a computer program product. The computer program product includes one or more computer instructions. When the computer instructions are loaded and executed in a computer, a flow or function described in accordance with the embodiments of the present disclosure is generated in whole or in part. The computer may be a general-purpose computer, a specialized computer, a computer network, or other programmable devices. The computer instructions may be stored in a computer-readable storage medium or transmitted from one computer-readable storage medium to another computer-readable storage medium. For example, the computer instructions may be transmitted from a website site, a computer, a server, or a data center to another website site, another computer, another server, or another data center in a wired manner (e.g., a coaxial cable, a fiber optic, and a digital subscriber line (DSL)) or a wireless manner (e.g., infrared, wireless, microwave, etc.). The computer-readable storage medium may be any available medium storable in the computer or a data storage device such as the server, the data center, etc., integrated by one or more available media. The available medium may be a magnetic medium (e.g., a floppy disk, a hard disk, a magnetic tape), an optical medium (e.g., DVD), or a semiconductor medium (e.g., a Solid State Disk (SSD)), etc.

Terms "first", "second", "third", and "fourth", etc. in the specification and claims of the present disclosure and in the accompanying drawings above (when existing therein) are configured to distinguish similar objects and are not necessary to be configured to describe a particular order or sequence. It should be understood that data such used may be interchangeable in an appropriate case, such that the embodiments described herein may be implemented in an order other than that illustrated or described herein. In addition, the terms "include" and "comprise" and any variations thereof are intended to cover non-exclusive inclusion. For example, a process, method, system, product, or apparatus including a series of steps or units are not necessary to be limited to those steps or units which are clearly listed, but may include those steps or units which are not clearly listed, or other steps or units inherent to the above process, method, product, or device.

What is claimed is:

1. A cell determination method, comprising:

receiving a first message from a network node at a current cell, wherein the first message is configured to indicate whether a Non Terrestrial Network (NTN) exists in a backhaul link of the current cell;

performing a cell selection based on the first message;

receiving a second message from the network node at the current cell, wherein the second message is configured to indicate whether the NTN exists in at least one of the backhaul link of the current cell or a backhaul link of a neighbor cell of the current cell;

determining candidate cells from at least one of the current cell or the neighbor cells of the current cell to obtain a candidate cell set;

determining, based on the second message, a candidate cell whose backhaul link has no NTN and which has the maximum number of beams having signal quality values greater than a threshold from the candidate cell set, to be a camping cell; and determining a candidate cell which has the maximum number of beams having the signal quality values greater than the threshold from the candidate cell set to be the camping cell, in response to the NTN existing in the backhaul link of each candidate cell in the candidate cell set.

2. The method according to claim 1, wherein the performing a cell selection based on the first message, comprises:

determining that the current cell is a non-camping cell in response to the NTN existing in the backhaul link of the current cell; and determining that the current cell is the camping cell in response to no NTN existing in the backhaul link of the current cell.

3. The method according to claim 1, wherein the performing a cell selection based on the first message, comprises:

determining device characteristic of an electronic device in response to the NTN existing in the backhaul link of the current cell; and performing the cell selection based on the device characteristic of the electronic device.

4. The method according to claim 3, wherein the performing the cell selection based on the device characteristic of the electronic device, comprises:

determining that the current cell is the camping cell in response to the device characteristic indicating that the electronic device is a delay-insensitive device; and determining that the current cell is a non-camping cell in response to the device characteristic indicating that the electronic device is a delay-sensitive device.

5. The method according to claim 1, further comprising when an electronic device meets a condition of starting a same-frequency measurement, performing the same-frequency measurement for the neighbor cell of the current cell to obtain the candidate cell set;

when the electronic device meets a condition of a heterodyne measurement, performing the heterodyne measurement for the neighbor cell of the current cell to obtain the candidate cell set.

6. The method according to claim 1, further comprising:

performing a cell measurement for the current cell and obtaining a measurement result;

determining whether to initiate a neighbor-cell measurement based on the measurement result; and performing the neighbor-cell measurement for the neighbor cell of the current cell to obtain the candidate cell set, in response to the measurement result indicating to initiate the neighbor-cell measurement; wherein the neighbor cell has the same frequency as the current cell, or the neighbor cell has the same priority of a frequency as the current cell.

7. A cell reselection method, comprising:

receiving a second message from a network node at a current cell, wherein the second message is configured to indicate whether a Non Terrestrial Network (NTN) exists in at least one of a backhaul link of the current cell or a backhaul link of a neighbor cell of the current cell; and performing a cell reselection based on the second message, wherein the performing a cell reselection based on the second message, comprises:

determining candidate cells from at least one of the current cell or the neighbor cells of the current cell to obtain a candidate cell set; and performing the cell reselection for a candidate cell in the candidate cell set based on the second message, wherein the performing the cell reselection for a candidate cell in the candidate cell set based on the second message, comprises:

determining, based on the second message, a candidate cell whose backhaul link has no NTN and which has the maximum number of beams having signal quality values greater than a threshold from the candidate cell set, to be a camping cell; and determining a candidate cell which has the maximum number of beams having the signal quality values greater than the threshold from the candidate cell set to be the camping cell, in response to the NTN existing in the backhaul link of each candidate cell in the candidate cell set.

8. The method according to claim 7, wherein the second message carries a delay of a backhaul link of the candidate cell, and the performing the cell reselection for a candidate cell in the candidate cell set based on the second message, comprises:

determining a candidate cell having a backhaul link with the shortest delay from the candidate cell set to be a camping cell based on the second message.

9. The method according to claim 7, wherein the performing the cell reselection for a candidate cell in the candidate cell set based on the second message, comprises:

determining a candidate cell which has the maximum number of beams having signal quality values greater than a threshold from the candidate cell set to be the camping cell, in response to the second message carrying a NTN type of a backhaul link of each candidate cell in the candidate cell set.

10. The method according to claim 7, wherein the performing the cell reselection for a candidate cell in the candidate cell set based on the second message, comprises:

determining device characteristic of an electronic device in response to the second message indicating that a backhaul link of the candidate cell exists the NTN; and performing the cell reselection based on the device characteristic of the electronic device.

11. The method according to claim 10, wherein the performing the cell reselection based on the device characteristic of the electronic device, comprises:

determining that a candidate cell which has the maximum number of beams having signal quality values greater than a threshold from the candidate cell set to be the camping cell, in response to the device characteristic indicating that the electronic device is a delay-insensitive device; and determining that the candidate cell in the candidate cell set is a non-camping cell in response to the device characteristic indicating that the electronic device is a delay-sensitive device.

12. The method according to claim 7, further comprising:

when an electronic device meets a condition of starting a same-frequency measurement, performing the same-frequency measurement for the neighbor cell of the current cell to obtain the candidate cell set;

when the electronic device meets a condition of a heterodyne measurement, performing the heterodyne measurement for the neighbor cell of the current cell to obtain the candidate cell set.

13. The method according to claim 7, further comprising:

performing a cell measurement for the current cell and obtaining a measurement result;

determining whether to initiate a neighbor-cell measurement based on the measurement result; and performing the neighbor-cell measurement for the neighbor cell of the current cell to obtain the candidate cell set, in response to the measurement result indicating to initiate the neighbor-cell measurement; wherein the neighbor cell has the same frequency as the current cell, or the neighbor cell has the same priority of a frequency as the current cell.

14. An electronic device, comprising:

a processor;

a memory; and a computer program, stored on the memory and runnable on the processor;

wherein when the computer program is executed by the processor, the processor is configured to implement:

receiving a first message from a network node at a current cell, wherein the first message is configured to indicate whether a Non Terrestrial Network (NTN) exists in a backhaul link of the current cell; and performing a cell selection based on the first message; or receiving a second message from a network node at a current cell, wherein the second message is configured to indicate whether a Non Terrestrial Network (NTN) exists in at least one of a backhaul link of the current cell or a backhaul link of a neighbor cell of the current cell; and performing a cell reselection based on the second message, wherein the processor is further configured to implement:

determining candidate cells from at least one of the current cell or the neighbor cells of the current cell to obtain a candidate cell set;

performing the cell reselection for a candidate cell in the candidate cell set based on the second message;

determining, based on the second message, a candidate cell of whose backhaul link has no NTN and which has the maximum number of beams having signal quality values greater than a threshold from the candidate cell set, to be a camping cell; and determining a candidate cell which has the maximum number of beams having the signal quality values greater than the threshold from the candidate cell set to be the camping cell, in response to the NTN existing in the backhaul link of each candidate cell in the candidate cell set.

15. The electronic device according to claim 14, wherein the processor is further configured to implement:

determining that the current cell is a non-camping cell in response to the NTN existing in the backhaul link of the current cell; and determining that the current cell is the camping cell in response to no NTN existing in the backhaul link of the current cell.

16. The electronic device according to claim 14, wherein the processor is further configured to implement:

determining device characteristic of an electronic device in response to the NTN existing in the backhaul link of the current cell; and performing the cell selection based on the device characteristic of the electronic device.

17. The electronic device according to claim 14, wherein the processor is further configured to implement:

determining that the current cell is the camping cell in response to the device characteristic indicating that the electronic device is a delay-insensitive device; and determining that the current cell is a non-camping cell in response to the device characteristic indicating that the electronic device is a delay-sensitive device.

18. The electronic device according to claim 14, wherein the second message carries a delay of a backhaul link of the candidate cell, and the processor is further configured to implement:

determining a candidate cell having a backhaul link with the shortest delay from the candidate cell set to be the camping cell based on the second message.

19. The electronic device according to claim 14, wherein the processor is further configured to implement:

determining a candidate cell which has the maximum number of beams having signal quality values greater than a threshold from the candidate cell set to be the camping cell, in response to the second message carrying a NTN type of a backhaul link of each candidate cell in the candidate cell set.

20. The electronic device according to claim 14, wherein the processor is further configured to implement:

determining device characteristic of an electronic device in response to the second message indicating that a backhaul link of the candidate cell exists the NTN; and performing the cell reselection based on the device characteristic of the electronic device.

* * * * *